United States Patent
Way et al.

(10) Patent No.: US 6,735,794 B1
(45) Date of Patent: May 18, 2004

(54) STRETCHER WITH CASTOR WHEELS

(75) Inventors: Christopher B. Way, Richland, MI (US); Craig C. Mulder, Dorr, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 10/221,824

(22) PCT Filed: Mar. 17, 2000

(86) PCT No.: PCT/US00/07522
§ 371 (c)(1),
(2), (4) Date: Sep. 16, 2002

(87) PCT Pub. No.: WO01/70161
PCT Pub. Date: Sep. 27, 2001

(51) Int. Cl.[7] ................................................. A61G 1/02
(52) U.S. Cl. ..................... 5/86.1; 5/610; 5/611; 296/20; 16/35 R
(58) Field of Search .......................... 296/20; 16/35 R; 5/86.1, 610, 611

(56) References Cited

U.S. PATENT DOCUMENTS

| | | | | |
|---|---|---|---|---|
| 3,409,105 A | * | 11/1968 | Clinton | 188/29 |
| 3,483,574 A | | 12/1969 | Belnap | |
| 3,826,528 A | * | 7/1974 | East | 296/20 |
| 4,276,962 A | | 7/1981 | Aulik | |
| 4,309,791 A | | 1/1982 | Aulik | |
| 4,349,938 A | * | 9/1982 | Fontana | 16/35 R |
| 4,998,320 A | | 3/1991 | Lange | |
| 5,014,391 A | | 5/1991 | Schulte | |
| 5,015,024 A | * | 5/1991 | Bloemer | 296/20 |
| 5,069,465 A | | 12/1991 | Stryker et al. | |
| 5,242,035 A | | 9/1993 | Lange | |
| 5,303,450 A | | 4/1994 | Lange | |
| 5,432,966 A | * | 7/1995 | Berta et al. | 5/611 |
| 5,509,159 A | * | 4/1996 | DuBois | 5/627 |
| 5,537,700 A | | 7/1996 | Way et al. | |
| 5,899,469 A | * | 5/1999 | Pinto et al. | 280/79.11 |
| 5,913,559 A | * | 6/1999 | Sexton et al. | 296/20 |
| 5,987,673 A | * | 11/1999 | Smith | 5/627 |
| 6,125,485 A | | 10/2000 | Way et al. | |
| 6,264,006 B1 | | 7/2001 | Hanson et al. | |
| 6,276,010 B1 | | 8/2001 | Way et al. | |
| 6,353,948 B1 | * | 3/2002 | Bolden et al. | 5/600 |

FOREIGN PATENT DOCUMENTS

| | | | |
|---|---|---|---|
| DE | 38 37 307 | | 11/1989 |
| DE | 91 12 253 | | 1/1992 |
| DE | 42 21 541 | | 1/1993 |
| DE | 295 17 605 | | 4/1997 |
| EP | 0 003 381 | | 6/1979 |
| FR | 1 570 144 | | 6/1969 |
| FR | 1570144 | * | 6/1969 |
| FR | 2701392 | * | 2/1993 |
| FR | 2 701 392 | | 8/1994 |
| GB | 406 456 | | 3/1934 |
| GB | 523114 | * | 6/1940 |
| GB | 523 114 | | 7/1940 |
| GB | 1 168 319 | | 10/1969 |
| GB | 2 269 095 | | 2/1994 |
| WO | WO 95/13199 | | 5/1995 |
| WO | WO 98/03355 | * | 1/1998 |
| WO | WO 98 03355 | | 1/1998 |

OTHER PUBLICATIONS

European Patent Office, Emergency Stretcher Search Results, TS 69002 US, Jul. 1999.

* cited by examiner

Primary Examiner—Michael F. Trettel
(74) Attorney, Agent, or Firm—Flynn, Thiel, Boutell & Tanis, P.C.

(57) ABSTRACT

An ambulance stretcher having a wheeled base (11) supported by foldable leg assemblies (16, 17). Castors (313, 393) are provided on the leg assemblies for providing improved mobility of the stretcher. The front castors (313) are selectively locked by a locking mechanism (30) to either allow the castors to swivel or roll in a single direction. The locking mechanism is accessible on both sides of the stretcher. Activation of the locking mechanism on either side of the frame selectively locks or unlocks both front castors.

25 Claims, 22 Drawing Sheets

STRETCHER WITH CASTOR WHEELS

FIELD OF THE INVENTION

This invention relates to an emergency stretcher which can be loaded into an emergency vehicle and, more particularly, to such an emergency stretcher with castor wheels.

BACKGROUND OF THE INVENTION

Emergency stretchers (also known as ambulance stretchers or cots) are specialized stretchers usually used in association with emergency vehicles. The ambulance stretcher is specialized due to it being capable of easy loading into the emergency vehicle. More specifically, the wheeled base and patient support structure are collapsible as the stretcher is moved into the inside of the emergency vehicle to facilitate ambulance personnel to work on the patient lying on the stretcher in the fairly limited space inside the emergency vehicle. Although preexisting ambulance stretchers are generally adequate for their intended purposes, they have not been satisfactory in all respects.

Stretchers are typically provided with wheels at the lower end of the support structure. The front pair of wheels rotate about a fixed axis to allow the stretcher to move in its longitudinal direction. An example of such wheels can be found in U.S. Pat. No. 5,015,024. While this wheel structure is adequate for longitudinal movement of the stretcher, it is inadequate for nonlongitudinal movement of the stretcher. Accordingly, it is desirable to provide a stretcher that has selectively pivotal castors on the front legs.

German Utility Model No. 295 17 605 shows another type of wheeled base that has selectively pivotal castors on a leg. A castor rotation device is provided to positively swivel the castors when the legs are collapsed by action of a screw type height control mechanism. A swivel blocking pin is mounted outside the leg. The blocking pin engages the castor to selectively prevent swiveling of the castor about the leg. A cable for controlling the pin is also provided outside the leg. However, for the castor rotation device to work the block pin must first be released from engagement with the castor. This adds an extra step during insertion of this stretcher into an emergency vehicle. Moreover, it is time consuming to collapse the legs using this screw type height control mechanism.

British Patent No. 1 168 319 shows a castor with both a rotational lock and a swivel lock. Both locks are provided on the castor at an end of a leg. This is a significant drawback in ambulance stretchers. It may be difficult to reach the castors with a person's foot. Moreover, the locks must be individually actuated to lock both legs.

U.S. Pat. No. 4,921,295 shows an ambulance stretcher having a track with two downwardly open channels that receive slide members. The legs are connected to the slide members. The legs pivot in response to movement of the slide members in the channels. The slide members are bearingless and metal. The track is metal. Oil lubricates the track so that the slide members can slide in the channels. There are some drawbacks associated with this arrangement. First, the structure requires lubrication. The lubricant can escape through the downward openings in the channels. Second, grit and other debris may enter the openings in the channels and be held by the lubricant. The grit may come into contact between the slide members and tracks causing excessive wear. Third, if either the slide member or track becomes worn or damaged, then that entire part must be replaced. Fourth, the channel is enclosed over about 270 degrees and only contacts the slide member over approximately 210 degrees. Thus, spaces are created between the slide member and the track. Fifth, due to the need for lubrication and the spaces between the slide member and channel, this stretcher should not be power washed. Power washing removes the lubricant and water will become trapped in the spaces between the slide member and channel.

SUMMARY OF THE INVENTION

The present invention provides castors so that the stretcher can operate in a castor mode to easily steer the stretcher. The castor mode allows the castors to swivel 360 degrees around the leg. The stretcher can also operate in a fixed mode to fix the castors in one direction so that the stretcher travels in the longitudinal direction. That is, the fixed mode prevents swiveling of the castors.

The present invention provides a castor lock control assembly that allows medical personnel to easily select the operating mode of the castors. The control assembly is accessible from both sides of the stretcher to lock or release the castors. Consequently, personnel need not be located at only one side of the stretcher to access the control assembly to select the mode of operation of the stretcher.

The control assembly of the present invention positively locks the castors in either a swivel state or in a fixed orientation. This improves the safety of the stretcher to prevent unintended release or lock of the castors.

The present invention houses the swivel lock mechanism in the leg. This prevents accidental operation of the swivel lock mechanism and improves its durability.

The present invention provides an auxiliary handle structure which has an extended position and a folded position relative to a stretcher base. The auxiliary handle structure, in the extended position, allows the height of the base to be adjusted. In the folded position, the auxiliary handle structure can not adjust the height of base.

The present invention provides a wear bumper arrangement on the legs, which withstands rigorous contact with the emergency vehicle during insertion and removal of the stretcher. The arrangement is easily installed on legs. The arrangement also includes a wear roller that supports the legs on the emergency vehicle.

The present invention has a beam providing a track for slidable elements that are connected to the legs. The slidable elements have slide bushings which allow the elements to easily slide within channels in the track to raise/lower the height of the ambulance stretcher or collapse the legs for insertion into a vehicle. These bushings are replaceable. Bushings contact the channel to support the slide elements and perform a wiping function thereby cleaning the channel.

BRIEF DESCRIPTION OF THE DRAWINGS

Preferred embodiments of the present invention will be described in detail hereinafter with reference to the accompanying drawings, in which.

DETAILED DESCRIPTION

Figure 1:
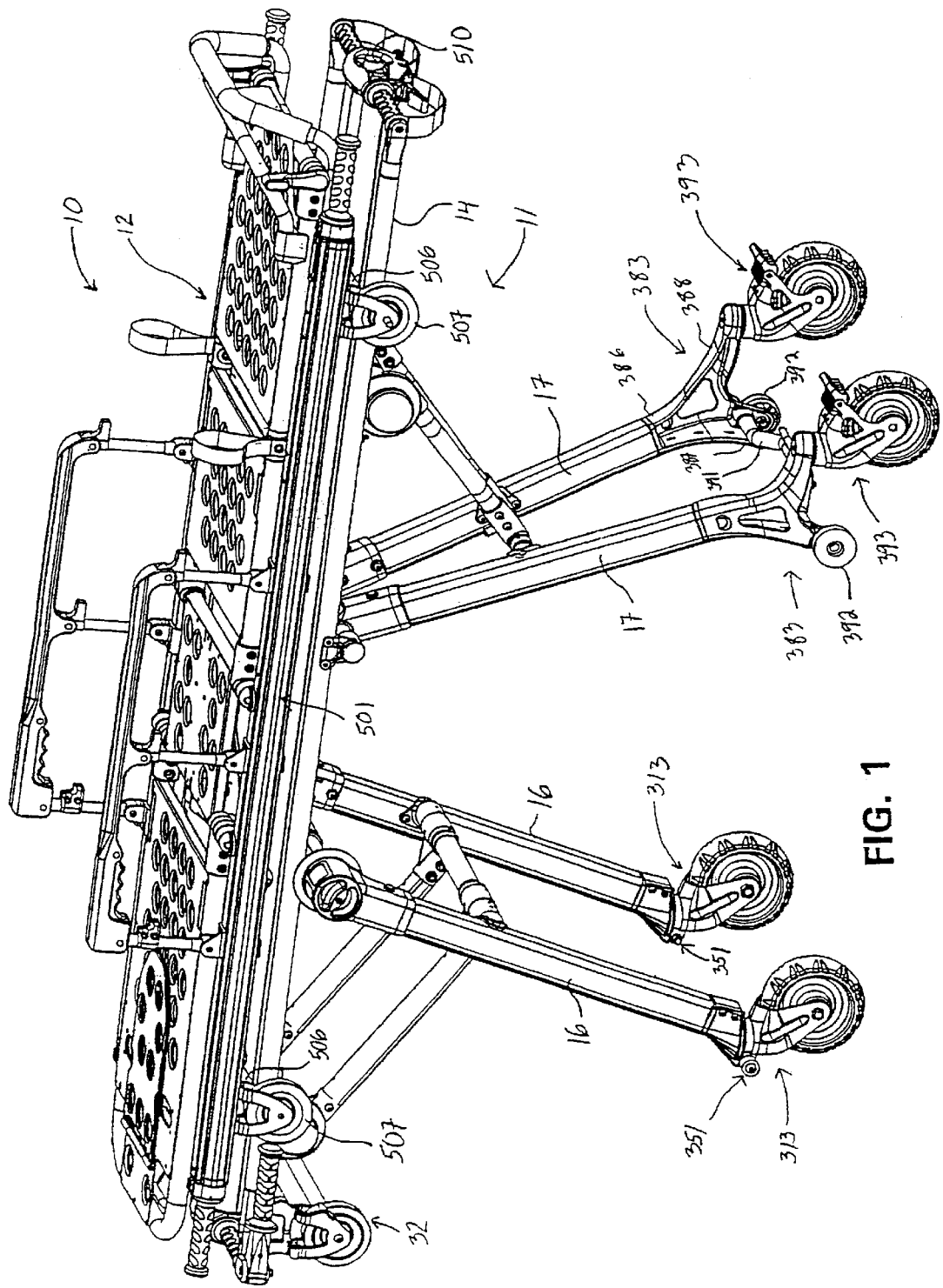
FIG. 1 is an isometric view of an ambulance stretcher embodying the invention.

An ambulance stretcher 10 embodying the invention is illustrated in the drawings. As shown in FIG. 1, the ambulance stretcher 10 includes a wheeled base 11 releasably supporting a patient litter 12. The base 11 includes a generally horizontal frame 14. A pair of front legs 16 are pivotally and slidably connected to the frame. A pair of rear legs 17 are pivotally connected to the frame rearwardly of the front legs 16. The legs 16, 17 pivot to adjust the height of the frame 14 above the ground. A height control mechanism 90 is connected to the frame 14 and the legs 16, 17 to control the pivoting of the legs 16, 17. Castors 313 are connected to the ends of the front legs 16 to improve mobility of the stretcher. A lock assembly 30 is provided to selectively position the castors 313 in a free swiveling state or in a fixed orientation. When castors 313 are in the swiveling state, the front of the stretcher 10 is easily steered. Castors 393 are connected to the ends of the rear legs 17. Castors 393 are always swivelable.

Figure 2:
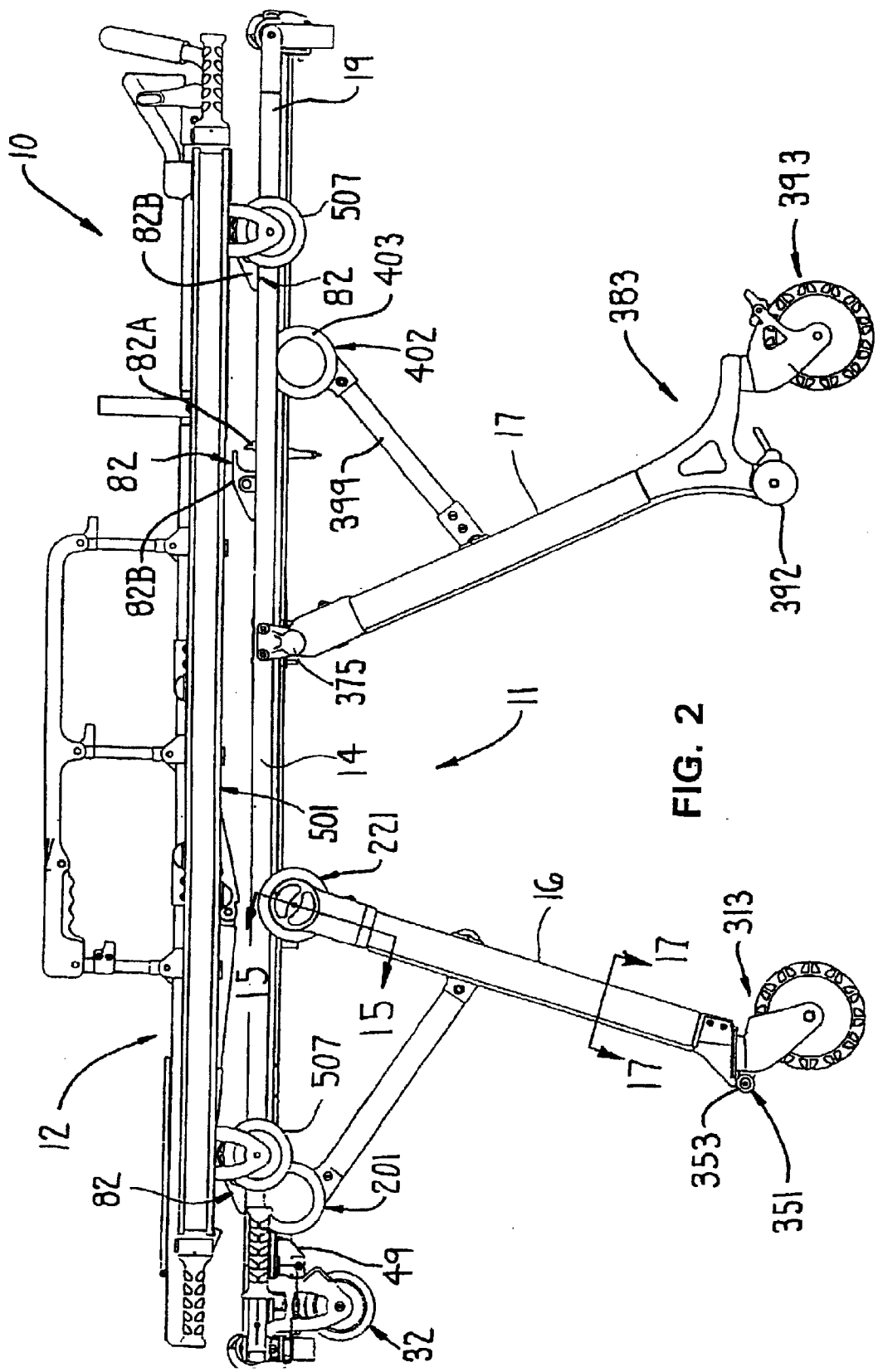
FIG. 2 is a side view of FIG. 1.
Figure 3:
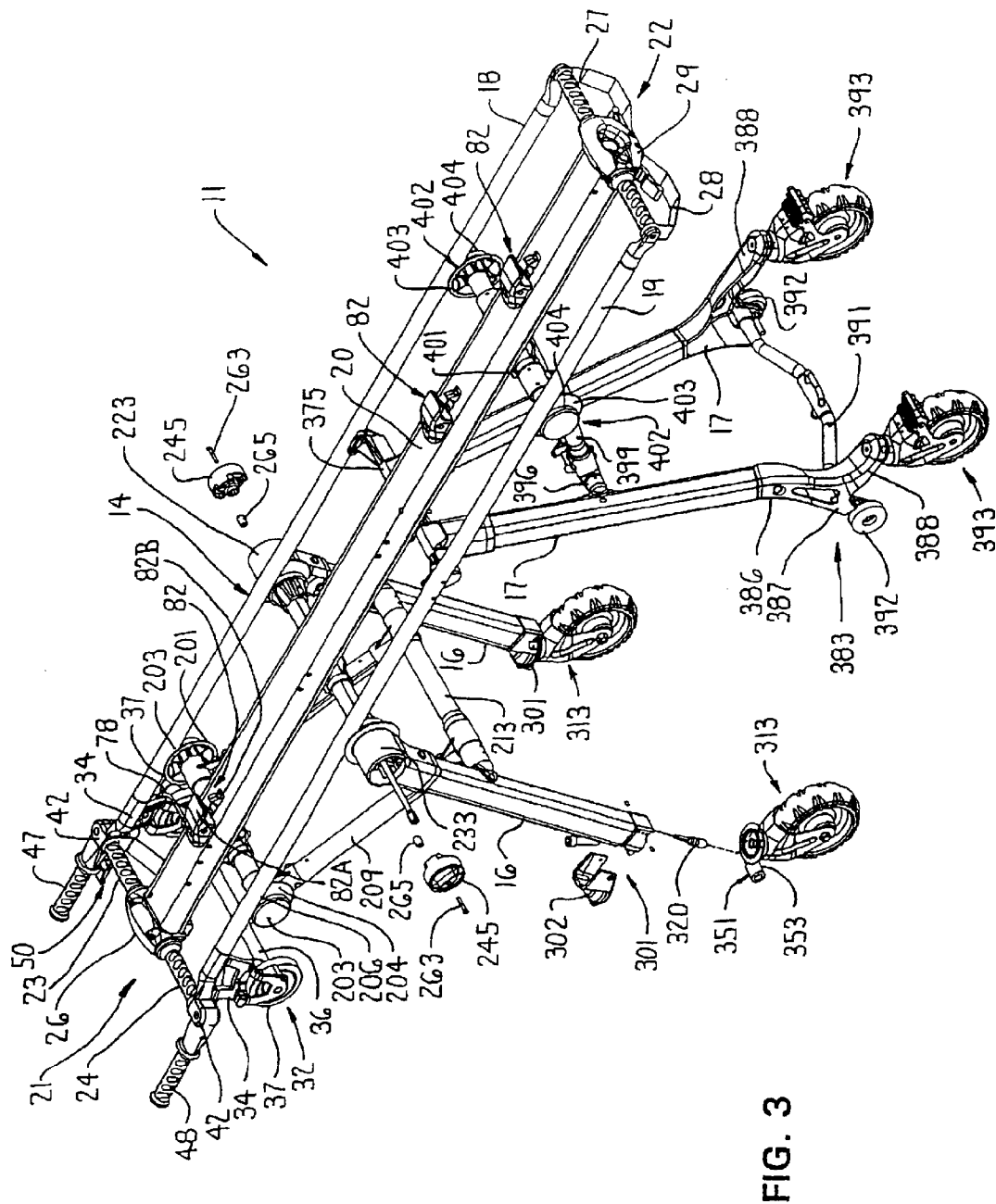
FIG. 3 is an isometric, exploded view of a wheeled base of the stretcher.

For purposes of this disclosure, the left end of the ambulance stretcher illustrated in FIGS. 1–3 is deemed to be the head end and the right end of the ambulance stretcher is deemed to be the foot end. Movement of the ambulance stretcher 10 to the left is a forward movement; movement to the right, rearward movement.

The frame 14 includes a longitudinally extending, elongate central support beam 20. A connector 26 is fixed on the head end of the beam 20. Handgrips 23, 24 extend outwardly from the connector 26 perpendicularly to the beam 20. A connector 29 is fixed to the foot end of the beam 20. Handgrips 27, 28 extend outwardly from the connector 29 generally perpendicular to the beam 20. Elongate side bar 18 is fixed to the handgrips 23 and 27. Elongate side bar 19 is fixed to the handgrips 24 and 28.

A wheel assembly 32 is positioned at the head end of the frame 14. The wheel assembly 32 includes supports 33, 34 respectively fixed to the bars 18, 19 (FIG. 3). The supports 33, 34 extend downwardly adjacent the head ends of the side bars 18, 19. The supports 33, 34 rotatably hold an axle 36. A pair of wheels 37 are mounted to opposite ends of the axle 36 adjacent the supports. The wheels 37 contact the floor of an emergency vehicle to support the head end of the stretcher 10 during insertion and removal of the stretcher from the vehicle.

Two foldable, elongate auxiliary handles 47, 48 are, respectively, connected to bars 18, 19 at the head end of the frame 11. A C-shaped pivot support 42 extends outwardly from each bar 18, 19. Each pivot support 42 includes a vertical base 43 fixed to a respective grip 23 or 24. Two vertically spaced-apart tabs 44 cantilever outwardly from the base 43 to define a handle receiving space (FIGS. 4–7). This space receives a butt end of handle 47 or 48 and allows the handle to horizontally pivot through an angle of about 180 degrees. A vertical through passage 46 extends through both tabs 44. The butt ends of handles 47, 48 each include a vertical through passage 49. The passages 46, 49 are aligned to receive a pin 51 pivotally attaching the handle to the respective support 42. The pins 51 define pivot axes about which the handles 47, 48 rotate in a generally horizontal plane. Vertical slots 45 are recessed in opposite sides of the butt end of each handle 47, 48. The slots 45 are essentially coplanar with each other and passage 49.

Figure 4:
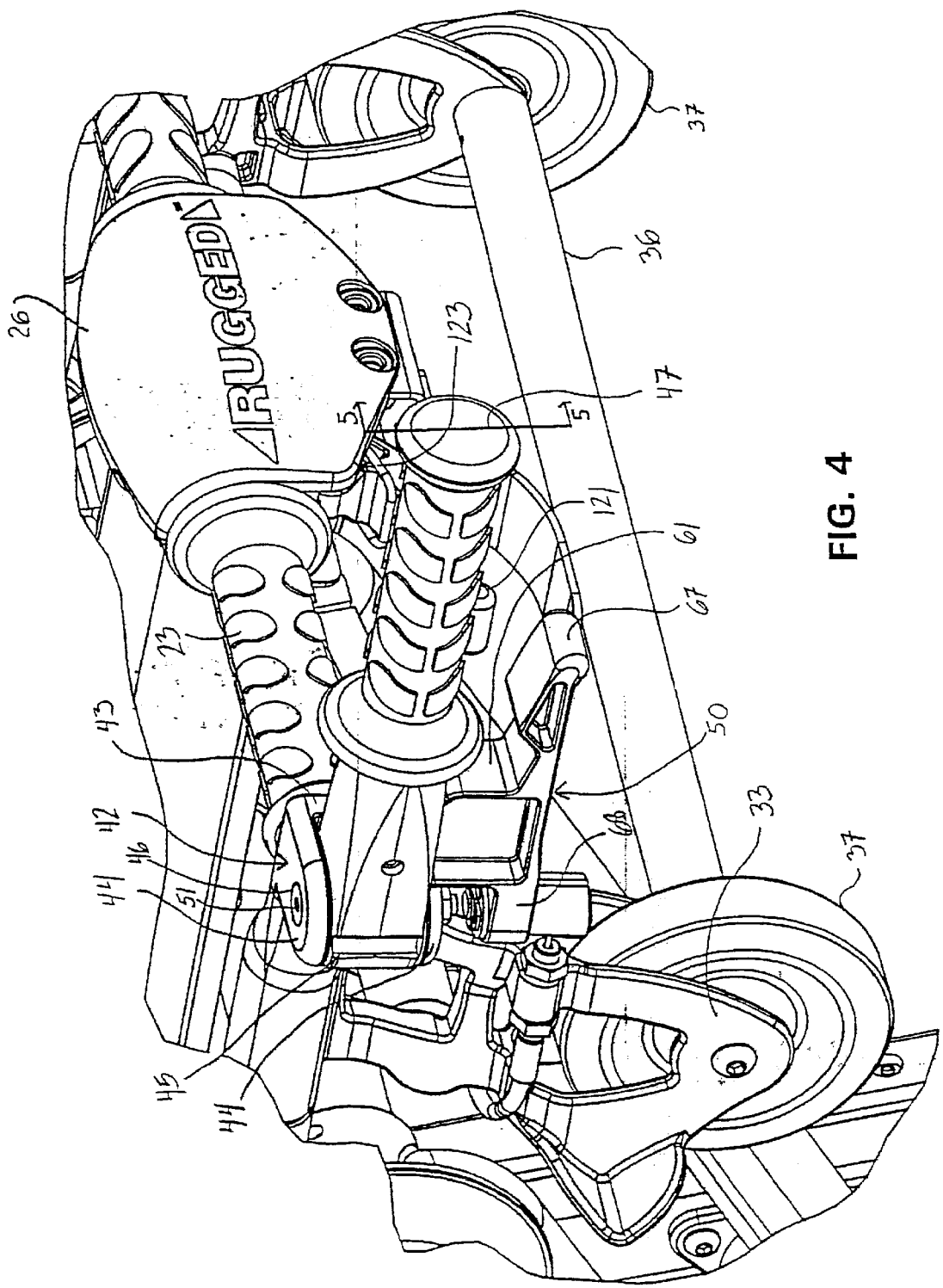
FIG. 4 is an enlarged, partial view of the head end of the stretcher base with an auxiliary handle extended.
Figure 5:
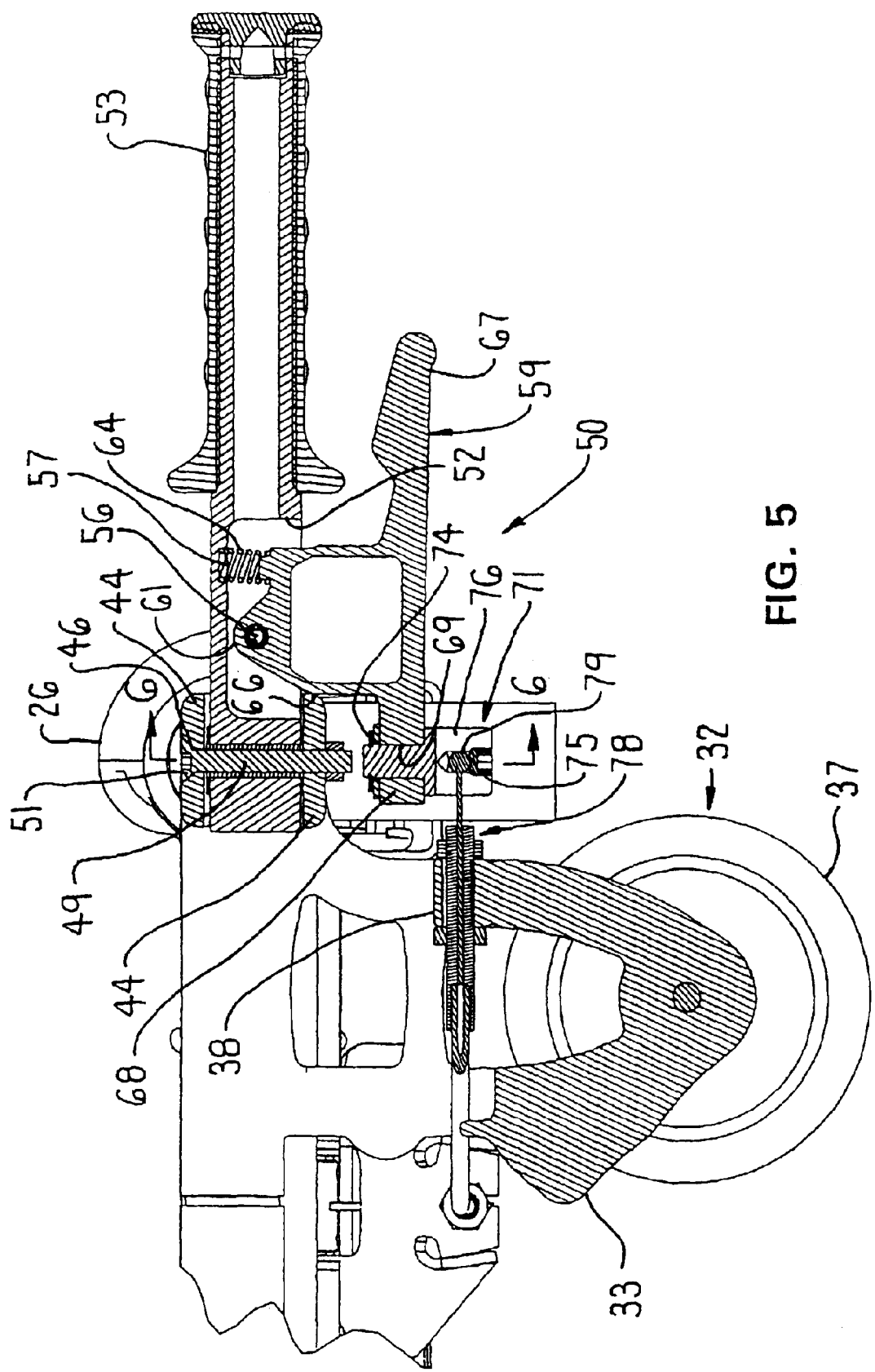
FIG. 5 is a partial sectional view taken generally along line 5—5 in FIG. 4.
Figure 7:
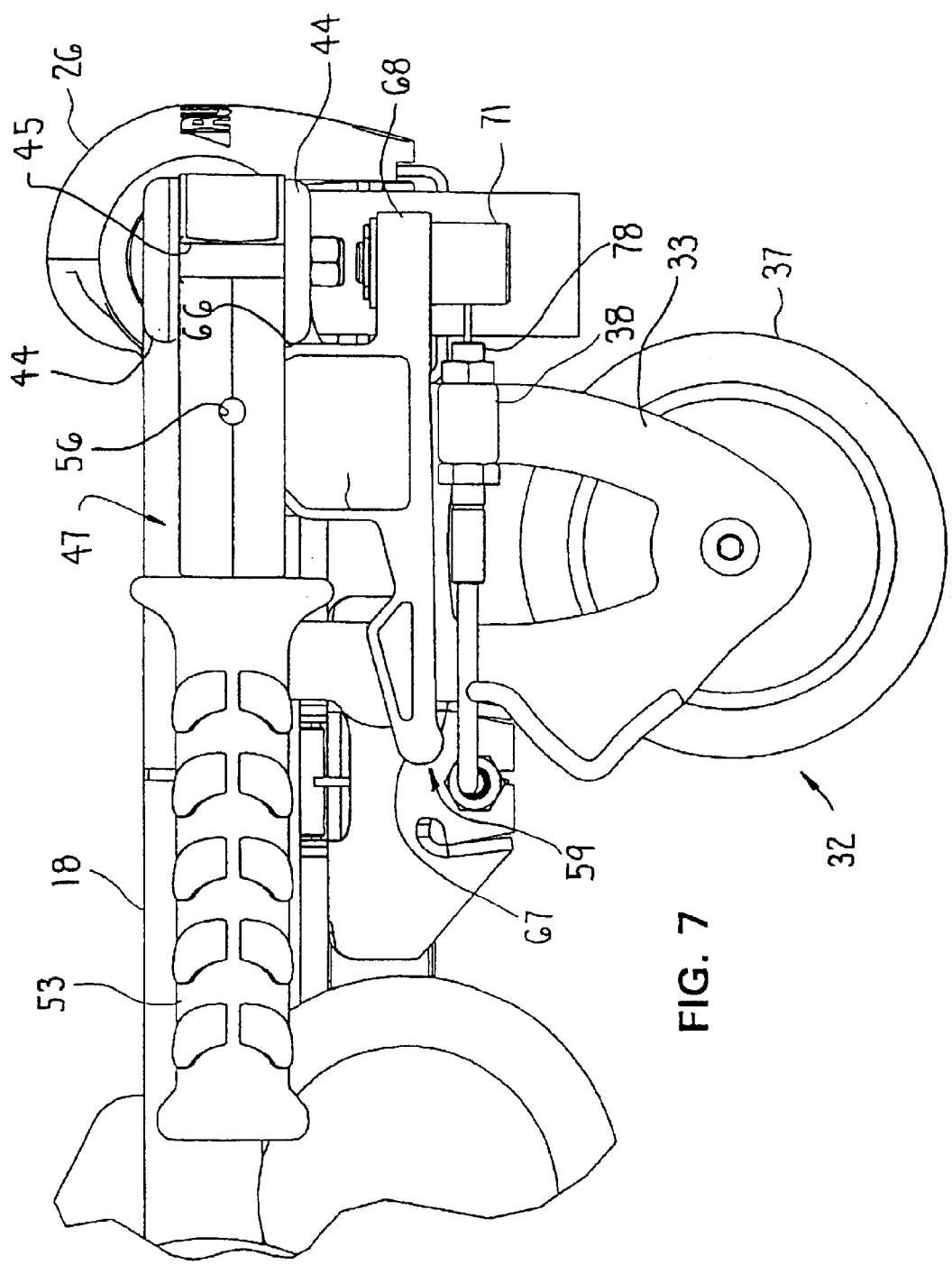
FIG. 7 is a side view of FIG. 4 with the auxiliary handle in its folded position.

The handle 47 is shown in its extended position in FIGS. 3–5. Handle 47 is shown in its folded position in FIGS. 2 and 7. The handle 48 is shown in its extended position in FIG. 3. Handle 48 has a folded position, which is essentially a mirror image of handle 47 as shown in FIG. 7.

Figure 6:
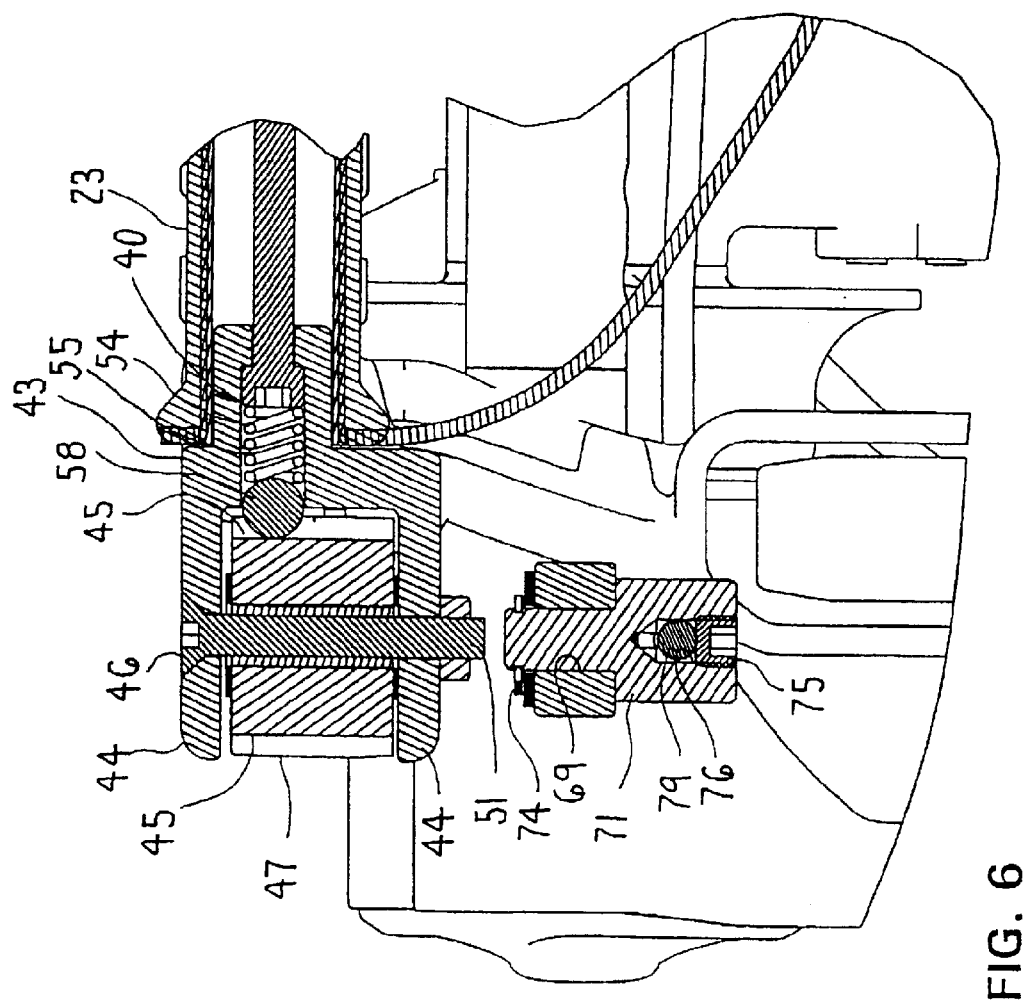
FIG. 6 is a partial sectional view taken generally along line 6—6 in FIG. 5.

A handle locking device 40 is mounted in each support 42, see FIG. 6. Each handle locking device 40 includes a biasing member 54, here a coil spring, received in a recess 55 formed in the support base 43. An engagement member 58, here shown as a ball, is movably, partially received in the recess 55. The biasing member 54 urges the ball outwardly against the associated handle 47 or 48. In the folded and extended positions of the handles 47, 48, the ball 58 seats in one of the slots 45 to hold the handle in the select position. Manual force is applied to the handles 47, 48 to pivot the handles from one position to the other. The manual force overcomes the force exerted by the biasing member 54 to unseat the ball 58 that holds the handle 47 or 48 in place.

A height adjustment actuator unit 50 is mounted to handle 47 for controlling height adjustment of the head end of the stretcher (FIGS. 4 and 5). The actuator unit 50 activates the height control mechanism 90 to lower the head end of the stretcher. For example, the head end can be lowered below the foot end. This position is sometimes referred to as the Trendlenberg position. Handle 47 has a downwardly open recess 52 and a pivot pin 56 extending transversely through the handle 47 adjacent the closed upper end of the recess 52. A circular depression 57 is recessed in the wall that defines the closed upper end of the recess 52. A height adjustment lever 59 having an inverted T-shape is positioned with its stem 61 extending into the recess 52.

The stem 61 is pivotally connected to the pivot pin 56, which define a pivot axis for the lever 59. Stem 61 includes an upwardly extending protrusion 63 on one side of the pivot axis 56 and a stop surface 66 on the other side of the pivot axis. The stop surface 66 abuts the adjacent tab 44 to halt further pivoting (clockwise in FIG. 5) of the lever 59. A spring 64 extends between the depression 57 and protrusion 63 to urge lever 59 to pivot clockwise about the pivot pin 56.

A handgrip arm 67 of the lever 59 is thus urged downwardly from the handle 47. A trigger arm 68, opposite the handgrip arm 67, has a vertical through passage 69 generally axially aligned with the pin 51. A hub 71 is rotatably mounted in the passage 69. The hub 71 includes at its lower end a radially enlarged base 73 and at its upper end a key 74. The base 73 and key 74 hold the hub 71 in the passage 69. A diametral slot 76 extends through the base 73 generally longitudinally of the stretcher base 11. An end of a control cable 78 having a ball 79 is fixed in the slot 76. For example, the ball 79 is inserted upwardly into the open bottom portion of the slot. This portion of the slot has a greater diameter than the remainder of the slot. Thus, the cable 78 extends through a smaller diameter portion of the slot and the ball 79 cannot move longitudinally from wider portion through the smaller portion. A set screw 75 is inserted into the wider portion of the slot to prevent removal of cable 78 downwardly from the slot. The cable 78, as shown, has an outer sheath and a slidable inner cable. A cable holder 38 attached to support 32 secures cable 78 adjacent the hub 71. The end of the cable 78 remote from the ball 79 is fixed to the height control mechanism 90.

In the extended position of the handle 47, shown in FIGS. 4 and 5, the height adjustment lever 59 can pull the cable 78 to unlatch the height control mechanism 90. As explained below, the unlatching of mechanism 90 allows the head end of the stretcher to be lowered. In the folded position of the handle 47 as shown in FIG. 6, the lever 59 pivots only in a direction where it will push the cable 78 against the latched control mechanism 90. Accordingly, in the folded position lever 59 will not unlatch the height control mechanism 90.

Figure 15:
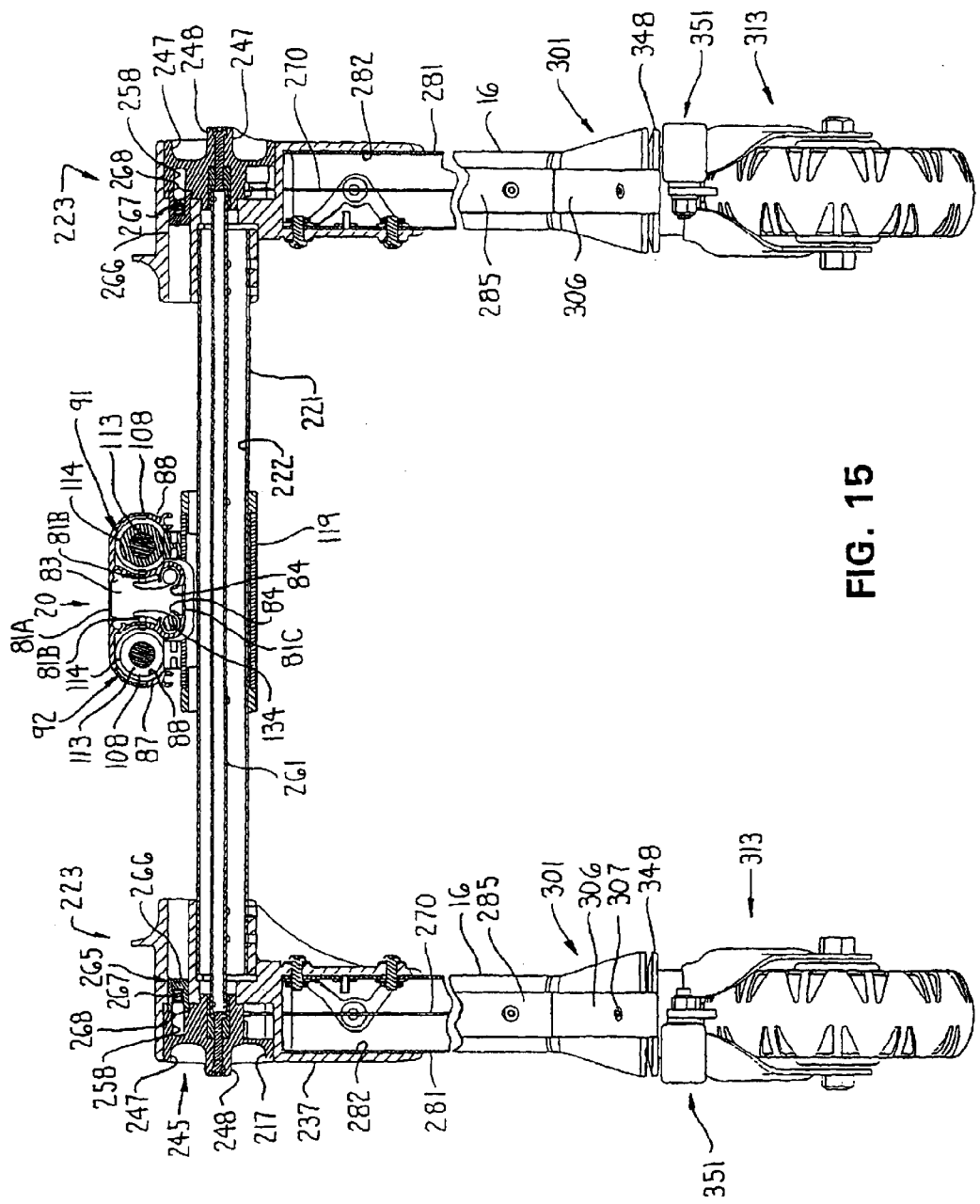
FIG. 15 is a partial cross section taken generally along line 15—15 in FIG. 2.

Referring to FIG. 15, center beam 20 includes a top wall 81A, opposed side walls 81B and a bottom wall 81C. Walls 81A, 81B and 81C collectively define a center through passage 83. The passage 83 is generally rectangular in cross section. Arcuate, inwardly open recesses 84 are defined by walls 81B and 81C at the lower corners of the passage 83. Arcuate flanges 87 extend outwardly from the top wall 81A. The flanges 87 define downwardly open channels 88 on each side of passage 83. The passage 83, recesses 84, and channels 88 extend the length of the beam 20. The height control mechanism 90 is mounted in the recesses 84 and channels 88.

Figure 8:
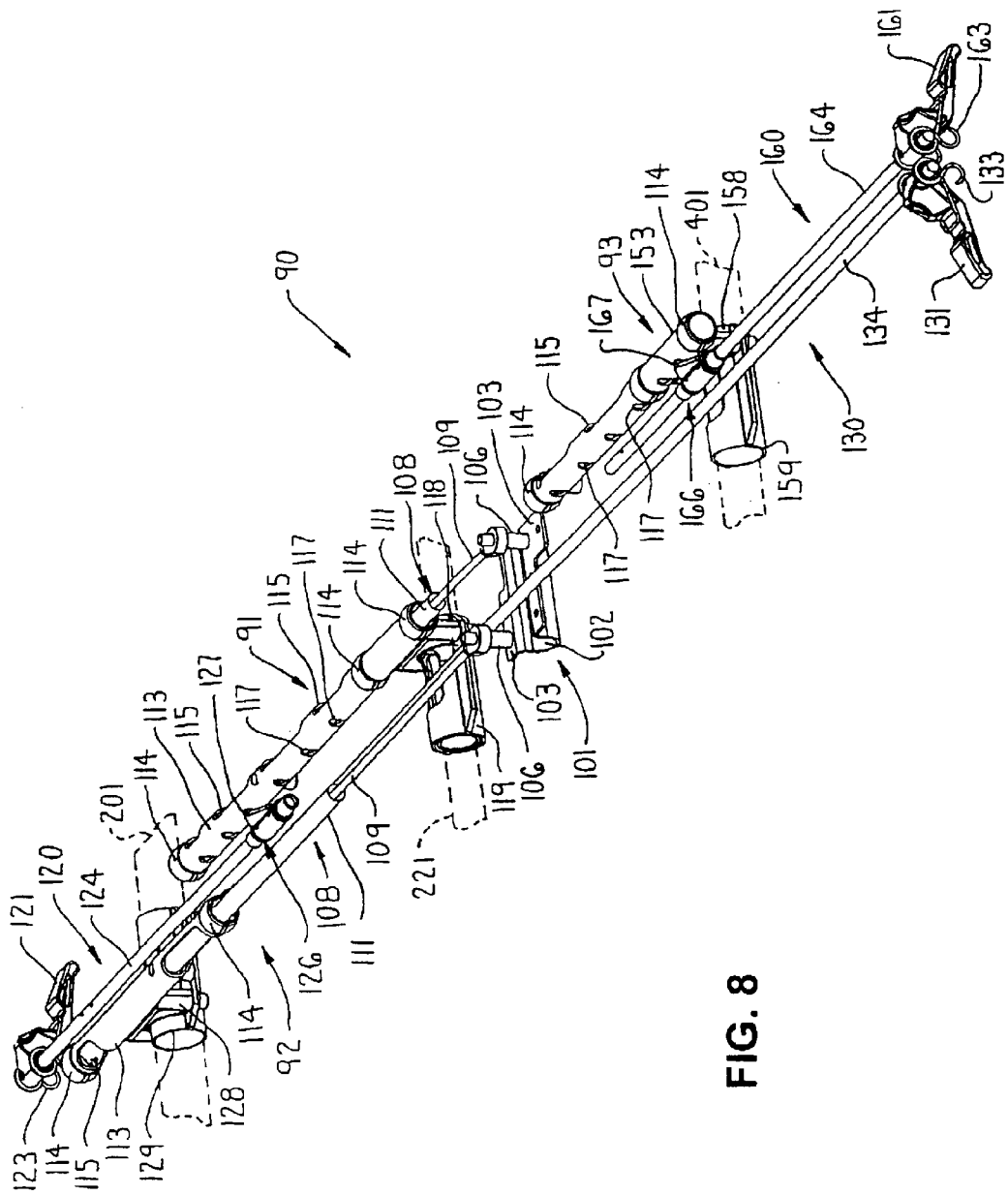
FIG. 8 is an isometric view of the height control mechanism.
Figure 9:
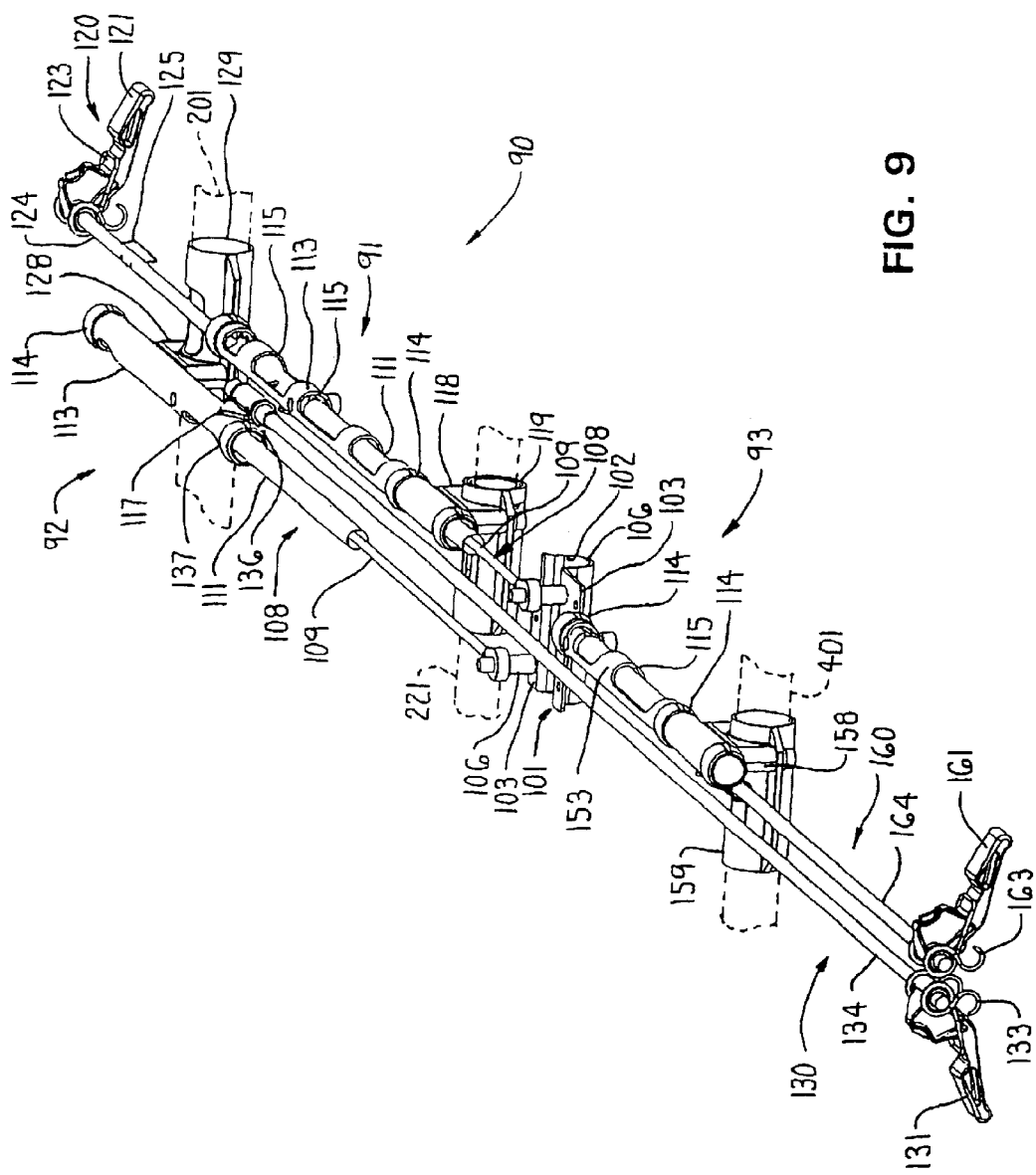
FIG. 9 is a second isometric view of the height control mechanism.
Figure 10:
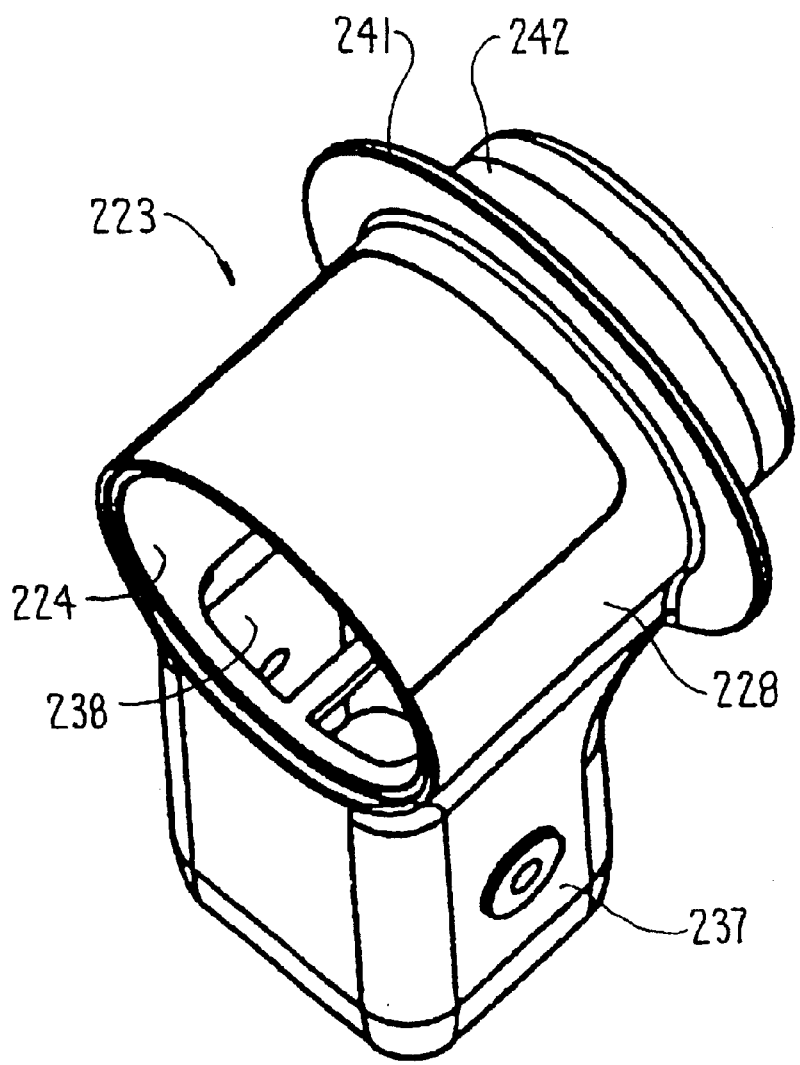
FIG. 10 is an enlarged perspective view of an end cap.

Turning now to the height control mechanism 90 shown in FIGS. 8 and 9, it includes two head end height control subassemblies 91, 92 and a foot end height control subassembly 93. The head end subassemblies 91, 92 pivot the front legs 16 to adjust the height of the head end of frame 14. More specifically, subassembly 91 moves the pivot axis of the front legs 16 along the frame 14 to alter the height of the stretcher head end. Subassembly 92 pivots front legs 16 about the pivot axis to collapse the front legs for insertion into a vehicle. The foot end control assembly 93 pivots the rear legs 17. This pivoting adjusts the height of the foot end of the frame or collapses the rear legs for insertion into a vehicle.

The height control mechanism 90 has a connector base 101 having a laterally extending center well 102 and coplanar flanges 103 at opposite sides of the well 102. The flanges 103 are fixed to beam 20 at substantially midlength of the beam. A connection pin 106 extends upwardly from each flange 103.

Each of the head end subassemblies 91, 92 has a forwardly extending, pneumatic spring 108 respectively housed in a left or right side channel 88. Each spring 108 has a rigid piston rod 109 respectively fixed to one of the pins 106. A cylinder 111 is slidably connected to each piston rod 109 remote from the pin 106. A cylindrical sleeve 113 partially telescopes over and is fixed to each cylinder 111. The sleeve 113 includes a plurality of slide bushings 114 on the outside thereof. At least one bushing 114 is removably fixed at each end of the sleeve 113. The bushings 114 are made of a slide bearing grade material, e.g. low friction material, and have an outer diameter sized to slidably fit within the channels 88. Accordingly, the bushings 114 do not require lubrication. The bushings 114 center the sleeve 113 in the channel 88. The sleeve 113 does not contact the portion of the beam 20 enclosing the channel 88. Only the bushings 114 slidably contact the beam 20. The bushings 114 contact the beam 20 throughout the arcuate cross section of the channel so that no spaces are created between the bushings and the beam or sleeve 113. The lack of lubricant and spaces between the bushings and beam allows the stretcher to be power washed. Moreover, the bushings 114 perform a wiping function while moving in the channel to sweep grit out the downward opening in the channels 88.

Sleeves 113 further include at least one outwardly open, larger hole 115 and at least one inwardly open circular, smaller hole 117 diametrically opposite the outwardly open hole 115. The right side sleeve 113 adjacent its rearward end further includes a downwardly cantilevered limb 118 that has a transversely extending sleeve 119. The sleeve 119 is adapted to rotatably mount an intermediate shaft 221 therein. The shaft 221 fixedly joins the front legs 16. The left side sleeve 113 adjacent its forward end further includes a downwardly cantilevered limb 128 that has a transversely extending sleeve 129. The sleeve 129 rotatably mounts a front shaft 201 therein. As discussed below, front shaft 201 is connected to the front legs 16 for pivoting the legs.

Height control subassembly 91 includes control unit 120 for selectively longitudinally positioning the sleeve 113 in the right side channel 88. Control unit 120 has a head end control handle 121 pivotally connected to and extending laterally from the connector 26. The handle 121 is vertically aligned with the handgrip 23. A spring 123 extends between the handle 121 and connector 26 to urge the handle 121 counterclockwise into a downward position. The handle 121 is fixed to a head end of an elongate control rod 124. Control rod 124 is rotatably housed in the right recess 84 in beam 20. A lever 125 is fixed to the control shaft 124. The cable 78 of the actuator unit 50 is connected to lever 125. A trigger lock 126 is fixed adjacent the rearward end of the rod 124 remote the handle 121 (FIG. 8). The lock 126 extends upwardly from the control rod 124. The lock 126 includes a finger 127 that extends laterally toward sleeve 113 through an opening (not shown) formed in the beam 20. Finger 127 selectively extends into one select hole 117 to fix the position of the sleeve 113 with respect to the beam 20. Rotation of the handle 121 to an upward position against the force of the spring 123 rotates the rod 124 to remove the finger 127 from the hole 117. Sleeve 113 is now able to slide in the channel 88 against the damping force of spring 108 to selectively position the sleeve 119 and shaft 221 longitudinally along the beam 20. Release of the handle 121 allows the force of spring 123 to rotate the handle 121 and rod 124 back to the locked state in which the finger 127 seats in a select one of the holes 117. This fixes the position of the sleeve 113 in the channel 88 and hence spatially fixes the sleeve 119 and shaft 221 lengthwise of the beam 20.

Height control subassembly 92 includes control unit 130 for selectively longitudinally positioning the sleeve 113 in the left side channel 88. Control unit 130 has a foot end control handle 131 pivotally connected to and extending laterally from the connector 29. The handle 131 is vertically aligned with the handgrip 28. A spring 133 extends between the handle 131 and connector 29 to urge the handle 131 counterclockwise into a downward position. The handle 131 is fixed to a foot end of an elongate control rod 134. Control rod 134 is rotatably housed in the left recess 84 in beam 20. A trigger lock 136 is fixed adjacent the forward end of the rod 134 remote the handle 131 (FIG. 9). The lock 136 extends upwardly from the control rod 134. Lock 136 includes a finger 137 that extends laterally toward sleeve 113 through an opening (not shown) in the beam 20. Finger 137 selectively extends into the one hole 117 to fix the position of the sleeve 113 with respect to the beam 20. Rotation of the handle 131 to an upward position against the force of the spring 133 rotates the rod 134 to remove the finger 137 from the hole 117. Sleeve 113 is now able to slide in the channel 88 against the damping force of spring 108 to selectively position the sleeve 129 and shaft 201 longitudinally along the beam 20. Release of the handle 131 allows the force of spring 133 to rotate the handle 131 and rod 134 toward the locked state. If the hole 117 is aligned with the finger 137, finger 137 will enter and latch the sleeve 113. The hole 117 aligns with the finger only in the raised position of the stretcher 10. If hole 117 is not aligned with finger 137, the sleeve 113 remains slidable in the channel 88. The channel 88 has stops (not shown) that limit the rearward and forward movement of the sleeve 113. Accordingly, the height control subassembly 92 has one fixed position with the finger 137 received in the hole 117.

The foot end height control subassembly 93 includes a cylinder 153 received in the right channel 88 rearwardly of the sleeve 113 of subassembly 91. The cylinder 153 is similar to sleeve 113 discussed herein except that it does not receive a pneumatic cylinder therein. The cylinder 153 includes a plurality of outwardly open, larger holes 115 and a plurality of inwardly open circular, smaller holes 117 diametrically opposite the outwardly open holes 115. The cylinder 153 adjacent its rearward end has a downwardly cantilevered limb 158 that has a transversely extending sleeve 159. The sleeve 159 is adapted to receive a rear shaft 401 that fixedly joins the rear legs 17. At least one bushing 114 is positioned at each end of the cylinder 153.

Height control subassembly 93 further includes control unit 160 for selectively longitudinally positioning the cylinder 153 in the right side channel 88. Control unit 160 has a second foot end control handle 161 pivotally connected to and extending laterally from the connector 29. The handle 161 is vertically aligned with the handgrip 27. A spring 163 extends between the handle 161 and connector 29 to urge the handle 161 clockwise into a downward position. The handle 161 is fixed to a foot end of an elongate control rod 164. Control rod 164 is rotatably housed in the right recess 84 of beam 20 rearwardly of control rod 124. A trigger lock 166 is fixed to rod 164 remote the handle 161 adjacent cylinder 153 (FIG. 8). The lock 166 extends upwardly from the control rod 164. The lock 166 includes a finger 167 that extends laterally through an opening (not shown) in the beam 20 toward the cylinder 153. Finger 167 selectively extends into one select hole 117 to fix the position of the cylinder 153 with respect to the beam 20.

Rotation of the handle 161 to an upward position against the force of the spring 163 rotates the rod 164 to remove the finger 167 from the hole 117. Cylinder 153 is then able to slide in the channel 88 to selectively position the sleeve 159 and shaft 401 longitudinally along the beam 20. The movement of the shaft 401 pivots rear legs 17 to control the height of the foot end of the stretcher as explained herein.

Release of the handle 161 allows the force of spring 163 to rotate the handle 161 and rod 164 to insert the finger 167 into an aligned hole 117. This fixes the position of the cylinder 153 in the channel 88. Fixing the position of the cylinder 153 locks sleeve 159 and shaft 401 lengthwise of the beam 20 to set the height of the stretcher foot end.

As shown in FIGS. 1–3, the connectors 26, 29 cover the ends of channels 88 to hold sleeves 113 and cylinder 153 in the channels 88. If the bushings 114 become worn and need to be replaced, then one of the connectors 26 and 29 are removed. The height control assembly 90 is then slid out one end of beam 20. The worn bushings are removed from the sleeves 113 and cylinder 153. New bushings 114 are fixed on the sleeves 113 and cylinder 153. The height control assembly 90, with new bushings 114, slides back into the recesses 84 and channels 88 of beam 20. This arrangement serves to minimize the costs associated with maintaining assembly 90.

Figure 11:
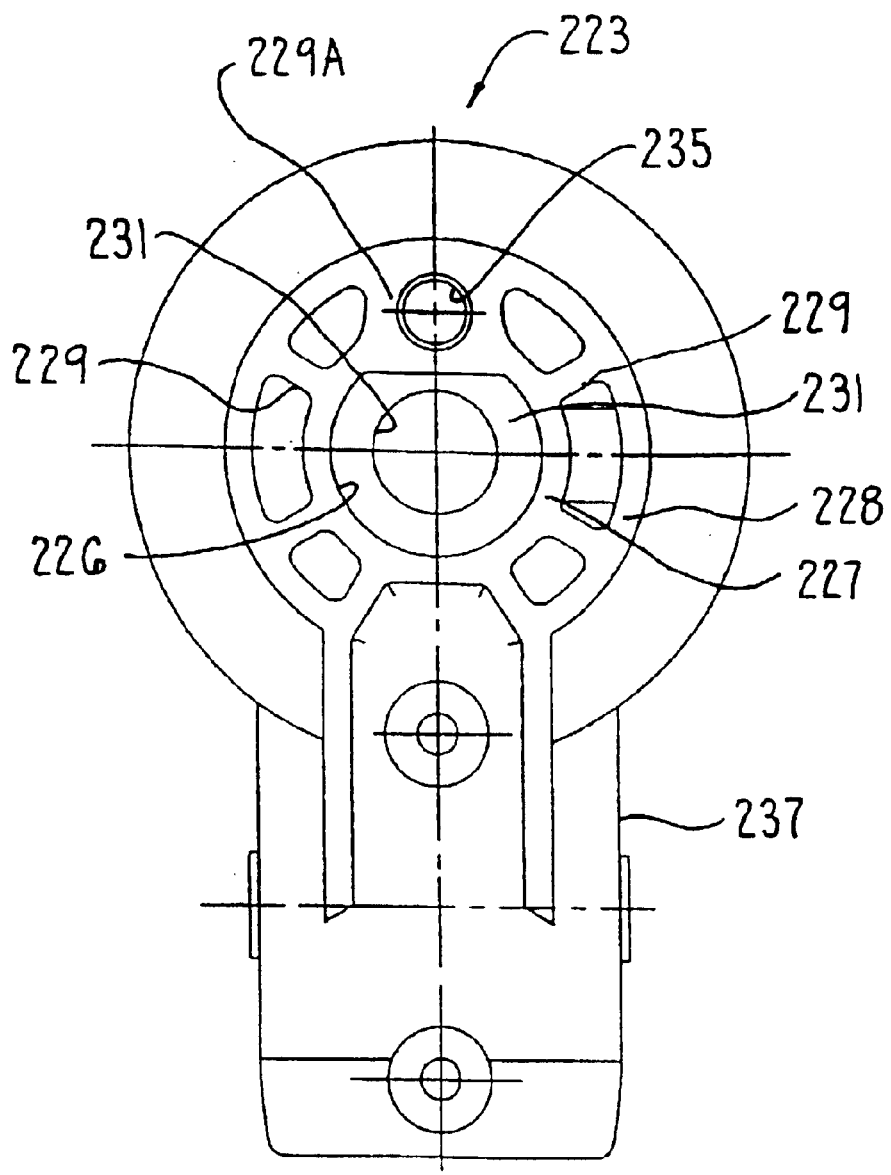
FIG. 11 is an elevational view of the FIG. 10.
Figure 12:
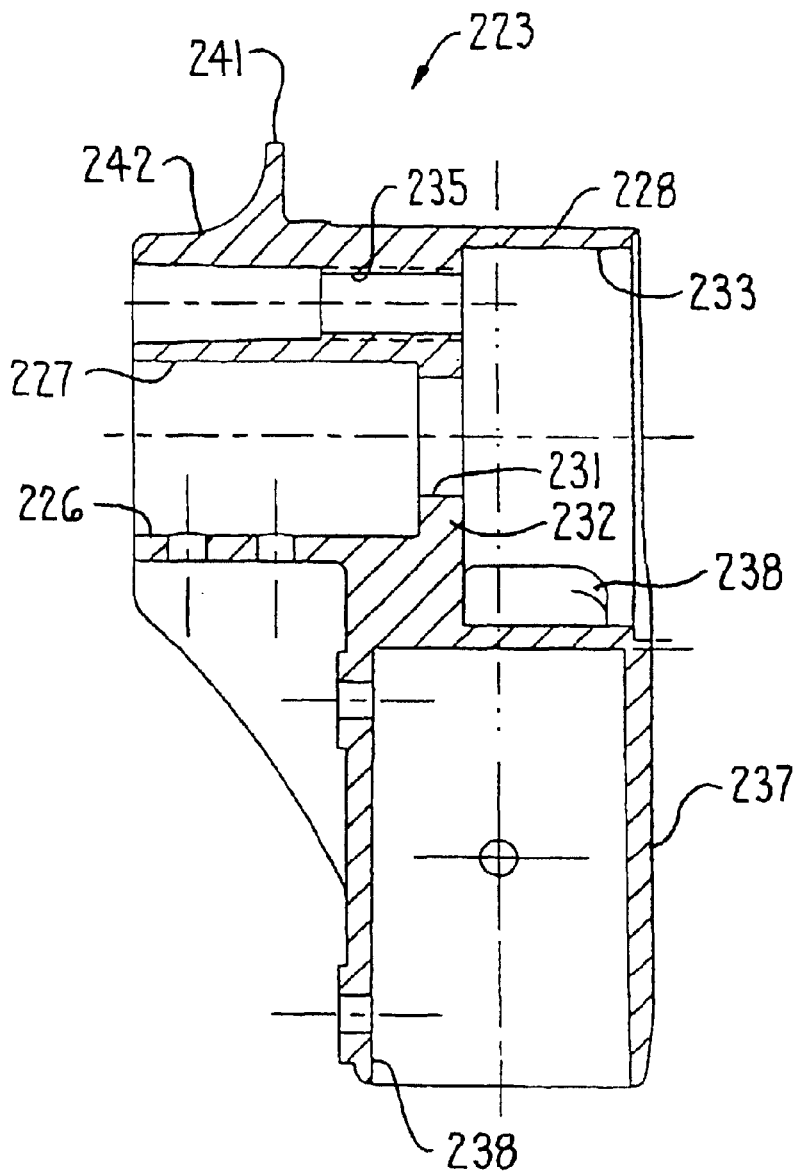
FIG. 12 is a cross section taken generally along line 12—12 in FIG. 11.

Referring now to FIG. 3, the shaft 221 extends laterally across the frame 14. The midlength of the shaft 221 is rotatably received through the sleeve 119 of subassembly 91. An end cap 223 is fixed to each end of the shaft 221. The ends caps fix front legs 16 to shaft 221. More specifically, shaft 221 has a generally D-shape in cross section with a longitudinal through passage 222 (FIG. 15). The end caps 223 each have a stepped center though passage 224 (FIG. 12). An inner wall 227 encloses the inward chamber 226 of the through passage 224 (FIGS. 11 and 12). A plurality of radial ribs 229 fix the inner wall 227 to an outer wall 228. The inward chamber 226 has a D-shape for nonrotatably receiving an end portion of D-shaped shaft 221. The center chamber 231 has a smaller diameter than the inward chamber 226 and is defined by a radially inwardly extending wall 232. The wall 232 also acts as a stop for the insertion of the shaft 221 into the inward chamber 226. The outward chamber 233 is cylindrical and has a larger diameter than the center and inward chambers. A stepped secondary through passage 235 extends through a wide, upper rib 229A. The passage 235 is parallel to the inward and center chambers 226, 231 and opens outwardly into the outward chamber 233.

An arcuate skirt 241 extends radially outwardly from the outer wall 228. The skirt 241 abuts an outer portion of a respective frame side bar 18, 19. Inwardly of the skirt 241, an arcuate portion 242 of the outer surface of the wall 228 supportingly abuts a lower portion of respective bar 18, 19. A rectangular extension 237 extends radially outwardly of the outer wall 228 diametrically opposite the secondary passage 235. The extension 237 forms a through passage 238 that fixedly receives an upper portion of one front leg 16. Through passage 238 opens into the outer chamber 233.

Figure 16:
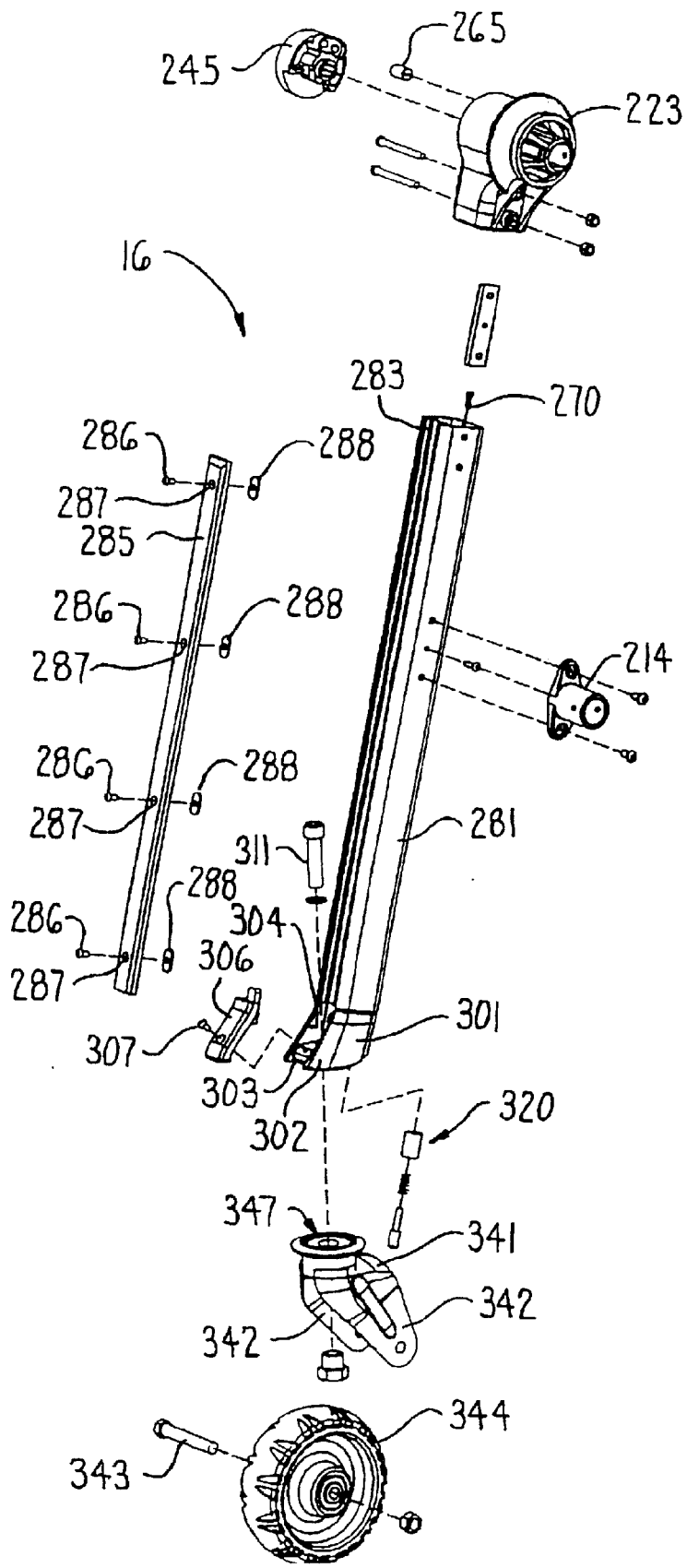
FIG. 16 is an exploded view of a leg assembly.
Figure 17:
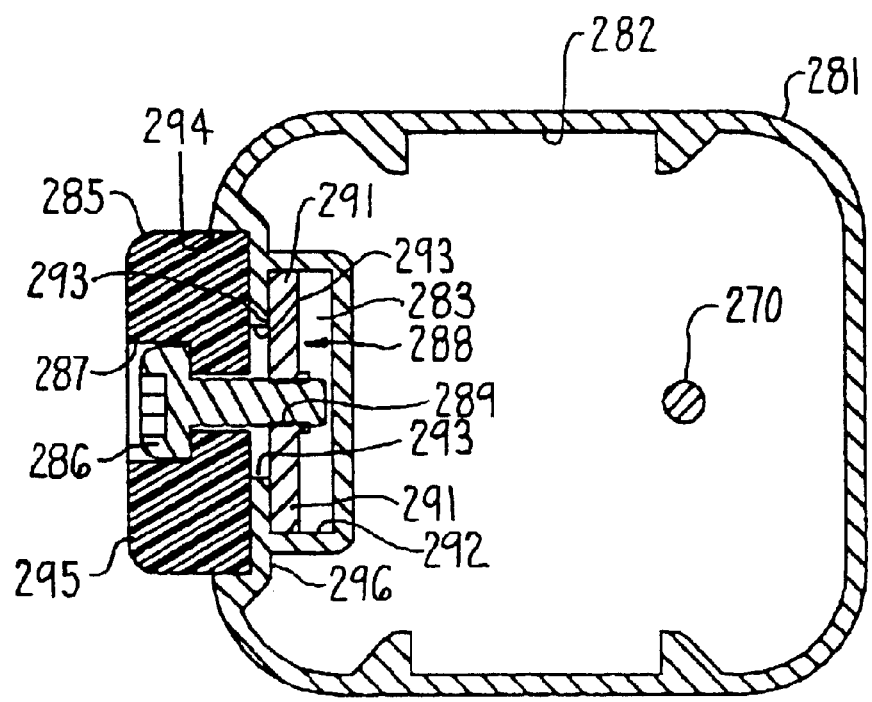
FIG. 17 is a cross section of the leg taken generally along line 17—17 in FIG. 2.

Referring to FIGS. 16 and 17, each front leg 16 includes an elongate main leg section 281 having an axial through space 282. The upper end of each main leg section 281 is fixed in the passage 238 of the associated end cap 223. The forward side of main section 281 has an I-shaped groove 283 that removably receives a wear bumper 285. The wear bumper 285 has a plurality of apertures 287. Apertures 287 receive a plurality of threaded fasteners 286. A plurality of nuts 288 each having a threaded through void 289 are positioned on the rear side of the bumper 285. Each void 289 threadedly receives one fastener 286. Each nut 288 also has diametrically opposed arms 291. The arms 291 define the length of nut 288. This length is greater than the width of the inner cross-space 292 of the I-shaped groove 283. The width of each nut 288 is less than the width of the intermediate space 293 of the I-shaped groove 283. The wear bumper 285 has a width generally equal to the width of the outer cross-space 294 of the I-shaped groove 283. The length of the wear bumper 285 is generally equal to the length of leg section 281 outside passage 238.

The wear bumper 285 is installed on the main leg section 281 as follows. The fasteners 286 are inserted rearwardly through the apertures 287 toward the nuts 288 positioned on the rear side of the bumper 285. The fasteners 286 are loosely threaded into the nut void 289 thereby creating a wear bumper/fastener assembly. The arms 291 are axially aligned with the groove intermediate space 293. The wear bumper/fastener assembly is inserted into the groove 283 with the nuts 288 passing through intermediate space 293 into the inner cross-space 292. The wear bumper 285 is received in the outer cross-space 294 with its outer wear surface 295 being outwardly of the forward surface of the leg section 281. The fasteners 286 are now rotated by a conventional means, for example by engagement with a wrench. The nuts 288 also rotate until its arms 291 contact the sides of the leg section 281 that form the inner cross-space 292. Consequently, the nuts 288 do not further rotate. Continued rotation of the fasteners 286 draws the nut thereto. Thus the wall 296 separating the inner and outer cross-spaces 292, 294 of the main leg section 281 is clamped between the nut and wear bumper. The fasteners 286 are countersunk into the apertures 287. Thus, only the wear surface 295 will contact a surface that abuts the front side of the front legs 16.

After the wear bumper 285 becomes worn, it can be replaced. The wear bumper/fastener assembly is removed from the main leg section 281 in a process similar to the one described above, but performed in reverse. As the fasteners 286 are initially turned, the nut 288 also turns until the arms 291 abut the sides of leg section 281 that form the inner cross-space 292 opposite the sides which the arms respectively contact during insertion of wear bumper 285 in the groove 283. The nuts 288 stop rotating and the fasteners unthread from the nut voids 289 releasing the wall 296 from between the bumper 285 and arms 291 of the nut. The wear bumper/fastener assembly is removed when the nuts longitudinally align with the intermediate cavity. Alternatively, complete unthreading of the fasteners 286 from the nuts 288 releases the wear bumper 285 from the main leg section 281.

Each leg 16 includes a downwardly extending skirt 301 fixed to the lower end of the main leg section 281 as shown in FIGS. 15–18. The skirt 301 has an extension 302, which extends forwardly with respect to the longitudinal axis of the main leg section 281, and a bottom wall 303. The forward extension 302 has a vertical groove 304 aligned with groove 283 in the main leg section 281. A short wear bumper 306 is fixed in the groove 304 by a countersunk fastener 307 threaded into a threaded space formed in the bottom wall 303. The fastener 307 extends generally perpendicular to the short wear bumper 306. The bottom wall 303 includes a generally centered first through void 309. A castor-mounting pin 311 extends through the void 309 to rotatably mount castor 313 to the skirt 301. The bottom wall 303 includes a second through void 314 rearwardly of first void 309.

Each castor 313 includes a base 341 and two spaced support arms 342 connected to the base 341. A rod 343 is mounted to arms 342. The rod 343 rotatably supports a wheel 344. The base 341 has a through aperture 346 extending generally perpendicular to the rod 343. A rotatable bearing structure 347 is fixed in the aperture 346. The castor-mounting pin 311 is rotatably fixed to the bearing structure 347. The castor 313 is thus rotatably joined to the skirt 301. Accordingly, the castor 313 swivels about pin 311.

An annular horn 348 extends radially outwardly of and is fixed to the bearing assembly 347 above the base 341. The annular horn 348 has a niche 349 recessed in the outer periphery thereof.

Diametrically opposite the niche 349, a wear roller structure 351 is fixed to the castor base 341. The structure 351 includes a forwardly extending support 352. A roller 353 is rotatably mounted on the support 352. The axis of rotation of wear roller 353 is parallel to the rotational axis of the castor wheel 344. The wear roller 353 extends forwardly of the forward extension 302 of the skirt 301 and thereby is the lowermost element on the front leg 16 with the front leg in a collapsed, generally horizontal position.

The lock assembly 30 includes a plunger lock 320 fixed in the second void 314 of each skirt 301. Each plunger lock 320 has a housing 321 fixed in void 314. The housing 321 forms a stepped through passageway 322. A stepped plunger pin 323 and a biasing member 324, here shown as a coil spring, are mounted in passageway 322. The biasing member 324 is confined between a radial step in the passageway 322 and a radial step in the pin 323 to urge the pin 323 downwardly out of the void 314. The upper end of the pin 323 is fixed to a link 326 joining the pin to a lower end of a control cable 270. The link 326 has a width greater than the width of the top end of passageway 322. Consequently, link 326 cannot enter the passageway 322. The link 326 contacting the top of the housing 321 defines the lowermost position of the pin 323 with part of the pin extending downwardly out of void 314. Pin 323 has a width slightly less than the width of niche 343. The pin 323 snugly fits in the niche 343 in the fixed orientation of the castor 313 to prevent wobble thereof.

Figure 13:
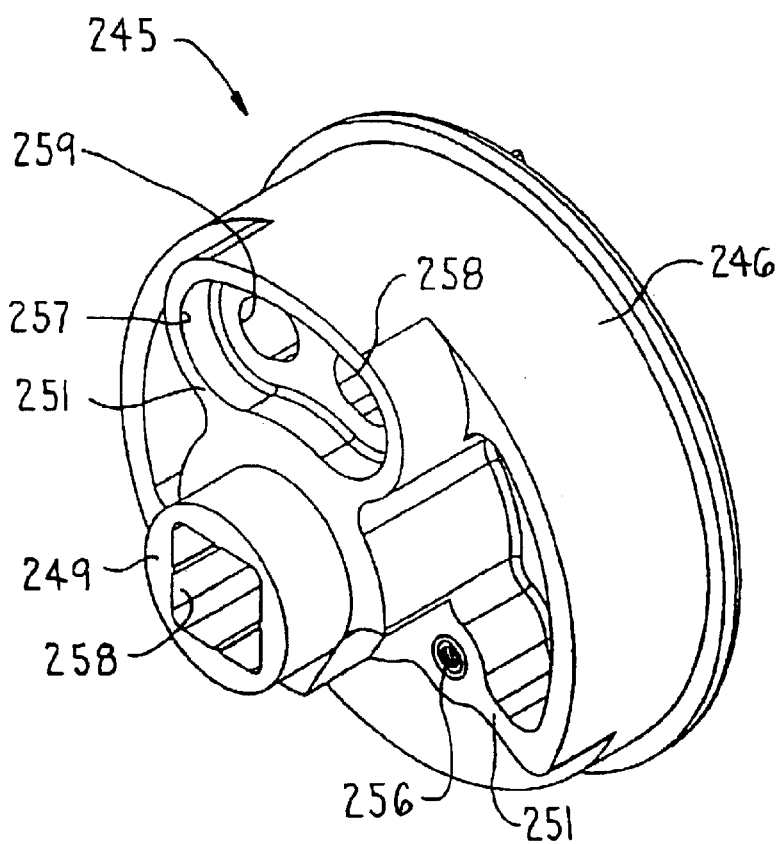
FIG. 13 is an enlarged perspective view of a control knob.
Figure 14:
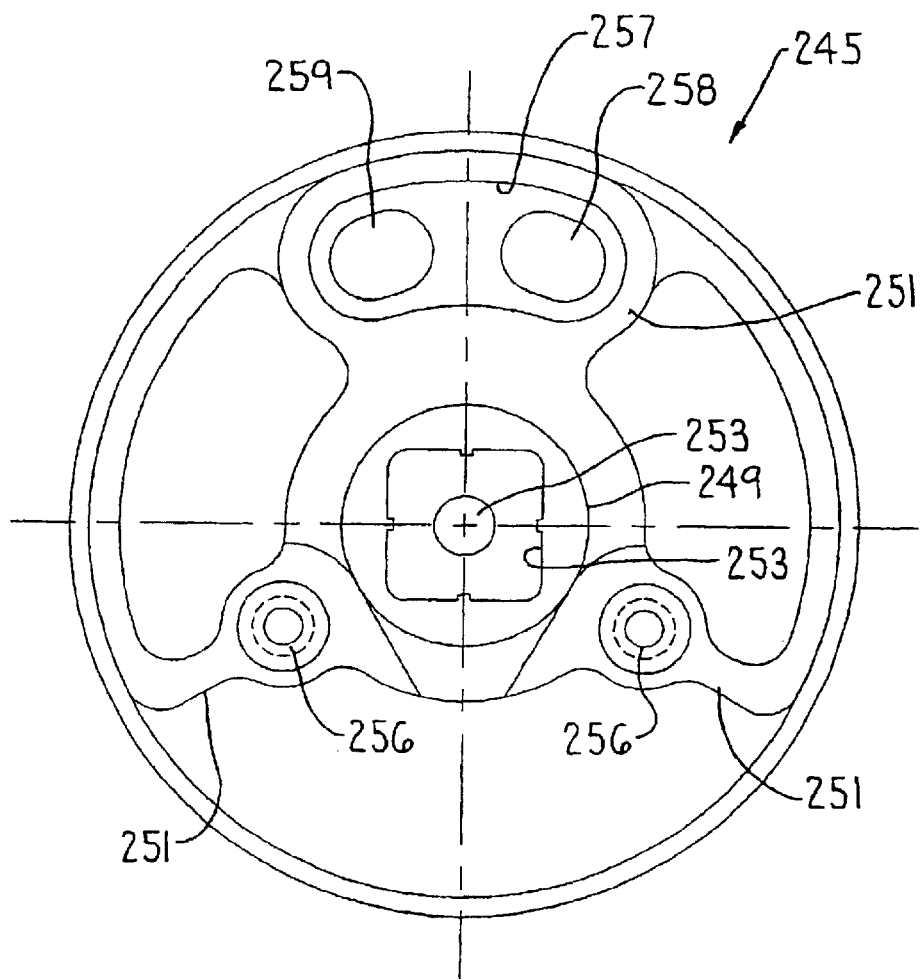
FIG. 14 is an elevational view of FIG. 13.

The lock assembly 30 also includes one control knob 245 received in the outward chamber 233 of each end cap 223 (FIGS. 15 and 16). Accordingly, one control knob 245 is on each side of the stretcher 10. Each control knob 245 has a generally cylindrical outer wall 246. The control knob in its outer face has two recesses 247 divided by a diametric wall 248. The wall 248 is adapted to be gripped by a person to rotate the knob. As shown in FIGS. 13 and 14, three radial ribs 251 fix an axial hub 249 to the outer wall 246. Hub 249 has a central through passage 252. The central through passage 252 is divided into a cylindrical outer part 253 and a square cross sectioned, larger inner part 254. Each of the downward two ribs 251 (FIG. 14) has a threaded recess 256 therein. The upper rib 251 has an arcuate width greater than the two downward ribs. The upper rib 251 includes an arcuate slot 257 recessed therein. Two spaced apart indentations 258, 259 are formed in the inner wall of rib 251 forming slot 257.

As shown in FIG. 15, a control knob 245 is received in the outer chamber 233 of the end cap 223 on each side of the stretcher. The hub 249 is partially received in the center chamber 231. A rigid control rod 261 extends through the interior space 222 of the shaft 221. The ends 262 of the control rod 261 are fixed in inner part 254 of passages 252. A fastener 263 extends through outer part 253 of the passage 252 and into a threaded recess in the rod end 262. Accordingly, the two control knobs 245 are fixed together through rod 261.

The secondary passage 235 in each end cap 223 is aligned with the slot 257 of the associated control knob 245. Ball-plunger assemblies 265 are fixed in the end cap secondary passages 235. Each ball-plunger assembly has a housing 266 fixed in the secondary passage 235. The housing 266 extends into the aligned control knob slot 257. A biasing member 267, here a coil spring, urges a ball 268 outwardly from the housing 266 into the slot 257. The ball 268 is receivable in one of the two indentations 258, 259 depending on the rotational position of the linked control knobs 245 relative to the end caps 223.

Control cables 270 extend through spaces 282 of legs 16. Each cable 270 extends through the passage 238 into the outer chamber 224 of end cap 223. A fastener 271 is received in a recess 256 to fix one end of the control cable to knob 245. The other end of the cable 270 is fixed to plunger lock 320 as explained herein.

Figure 18:
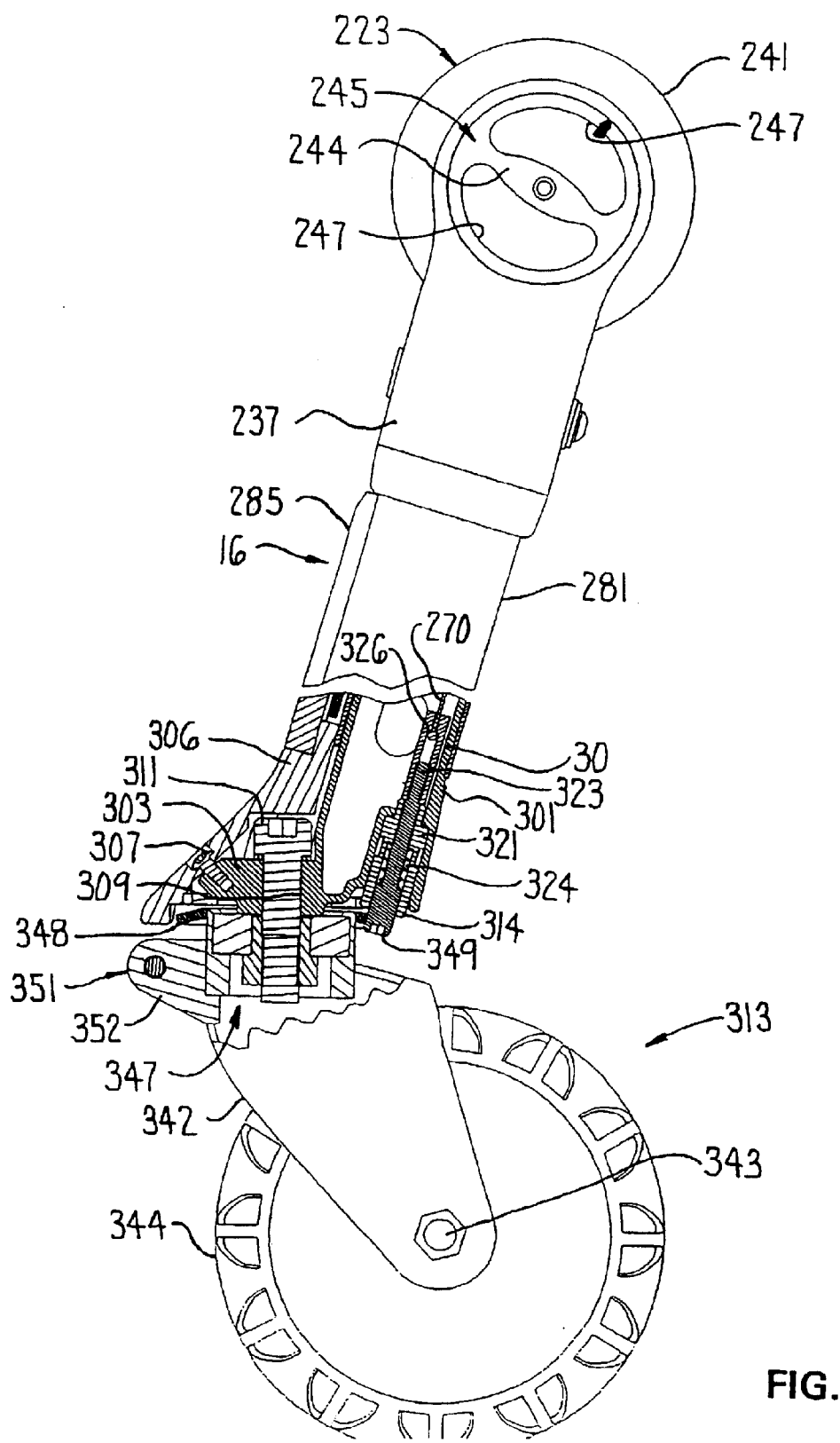
FIG. 18 is a partial cross sectional view of a leg assembly with the castor lock engaged.
Figure 19:
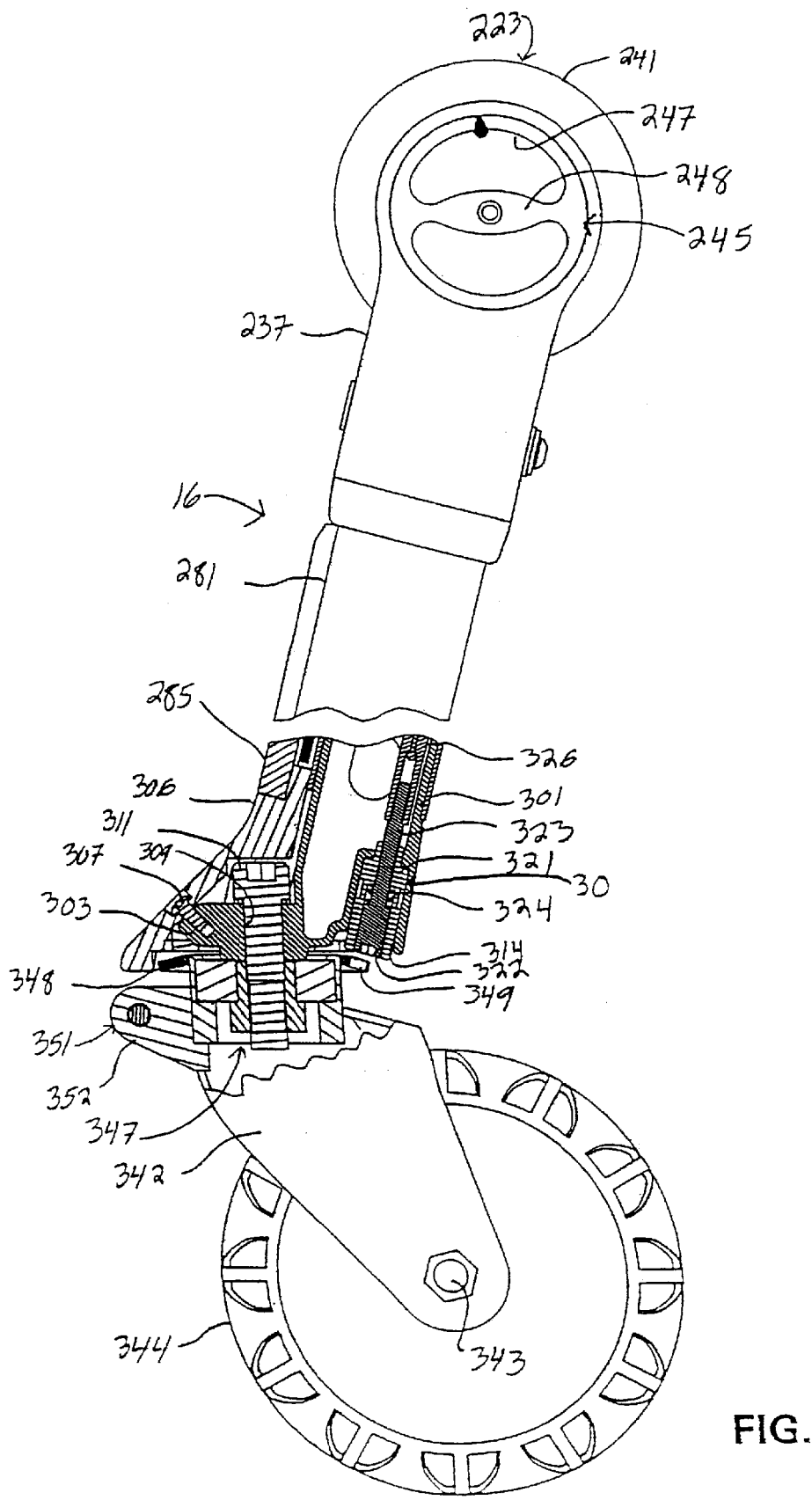
FIG. 19 is a partial cross sectional view of the leg assembly with the castor lock disengaged.

The rotational position of the knobs 245 determines the mode of operation of the front castors 313. In a locked mode, the castors are in a fixed orientation. In the fixed orientation, castors 313 do not swivel about mounting pin 311. The wheels 344 still rotate to facilitate longitudinal movement of the stretcher. The castors 313 are locked in this mode by extending locking pin 323 into niche 349 in castor horn 348 (FIG. 18). The longitudinal direction of travel provided in the fixed orientation of the castors 313 is suitable in many situations. However, it is sometimes desirable to have the castors 313 in a castor mode. In the castor mode, castors 313 freely swivel to increase the maneuverability of the stretcher 10. Castors 313 are in this mode when the pin 323 is removed from the niche 349 (FIG. 19). The castors 313 can now freely swivel about mounting pin 311.

A person can select the castor operational mode from either side of the stretcher 10. For example, if the stretcher 10 is against a wall, then one of the control knobs is inaccessible. The other control knob 245 will be accessible. The knobs 245 are fixed together by rod 261. Rotating one knob forwardly (counterclockwise) from the position shown in FIG. 18 unlocks both castors 313 so that they swivel about mounting pin 311.

The control knobs 245 are limited in their rotation by ball plunger assemblies 265. The housing 266 of each ball plunger assembly 265 extends into the arcuate recess 257 in adjacent control knob 245. The housing 266 limits the rotation of the control knob to the arcuate length of the recess 257. The ball 268 is urged by the biasing member 267 into one of the two indentations 259, 258. With the control knob 245 rotated rearwardly to their greatest extent (FIG. 18), the ball 268 is received in recess 258 in the fixed orientation of the castor 313. Accordingly, the lock assembly 30 is positively held in the position corresponding to the fixed orientation of the castors 313.

If it is desired to unlock castors 313, then one of the control knobs 245 is rotated forwardly with sufficient force to overcome the combined force of the biasing members 267. Once this force is overcome, the control knobs 245 rotate forwardly (counterclockwise in FIG. 18). Balls 268 unseat from indentations 258. During rotation the balls 268 ride on the closed wall forming the adjacent recess 257 until the other indentations 259 align with the balls. The biasing members 267 then urge the balls 268 into indentations 259. The control knobs 245 pull the cable 270 upwardly. The lock pin 323 correspondingly moves upwardly out of niche 349. The knobs and lock pins are now in the position shown in FIG. 19 and the castors 313 are freely rotatable. Once again the lock assembly 30 is held in position.

Referring again to FIG. 3, the front shaft 201 is rotatably received in the front sleeve 129. An end cap 203 is fixed over each end of the shaft 201. An annular skirt 204 extends outwardly of cap 201. The skirt 204 extends inwardly along the respective side bar 18, 19. Each end cap 203 has a slide surface 204 positioned outwardly of skirt 204. The slide surface 204 abuts the lower face of the respective side bar 18, 19. Each end cap 203 has an extension 207 extending transversely of the shaft 201. One end of elongate rearwardly extending brackets 209 are fixed to extensions 207. The rearward ends of the brackets 209 are moveably connected to connectors 211. The connectors 211 are fixed to a cross brace 213. The cross brace 213 is rotatably fixed by mounts 214 between the two front legs 16. Accordingly, movement of the front shaft 201 causes the legs 16 to pivot about shaft 221. The pivoting of the front legs 16 about shaft 221 causes the front legs to collapse for insertion into a vehicle and to lower during removal from a vehicle.

The rear legs 17 are rotatably joined at their upper ends to an elongate shaft 375. Shaft 375 is fixed to both side bars 18, 19 and extends through the well 102 of the base 101. Accordingly, the shaft 375 defines a pivot axis for the rear legs 17. Legs 17 have wear bumpers 285 mounted to the front surface thereof in the same manner as described herein in conjunction with the front legs 16. Feet assemblies 383, 384 are respectively fixed to the lower ends of rear legs 17. The feet assemblies 383, 384 are mirror images of each other. Foot assembly 383 includes three arms 386, 387, 388 forming an inverted Y-shape (FIGS. 1–3). The first arm 386 is fixed to the lower end of the leg 17. An elongate cross brace 391 is fixed to the second legs 387 of both foot assemblies. A roller 392 is mounted to the lower end of the second leg 387. A castor 393 is pivotally mounted to the third leg 388.

A cross brace 396 is fixed between the rear legs 17. Brackets 398, 399 at one end are rotatably mounted to the cross brace 396. The opposed end of brackets 398, 399 are fixed to end caps 402 that are fitted to the ends of rear shaft 401. Rear shaft 401 is rotatably mounted in the rear sleeve 159. Each end cap 402 has an annular, outwardly extending skirt 403. The skirts 403 extend along the inner surface of the associated side bar 18 or 19. End caps 402 each have a slide surface 404 that abuts the undersurface of the associated side bar 18 or 19.

As shown in FIGS. 1 and 2, the patient litter 12 includes a rectangular frame 501 having laterally extending rods 506. Wheels 507 are attached adjacent the four corners of the litter frame 501 on rods 506.

Latches 82 are mounted to the center beam 20. Rods 506 are removably received in the latches 82 thereby joining the litter 12 to the base 11. The shafts 506 contacting the latches 82 in a forward direction displaces lower jaws 82A of the latches 82 so that the rods are received between a fixed upper jaw 82B and the movable lower jaw 82A of the latches. The lower jaw 82A is manually released so that the litter 12 can be rearwardly removed from the base 11. A button 510 is provided in the foot end connector 29. Depressing the button 510 releases the lower jaw 82A. For example, pressing the button 510 can turn bell cranks that retract the lower jaws 82A to release the shafts 506 from the jaw. It is within the scope of this present invention to provide other structures for releasably securing the litter to the base.

Figure 20:
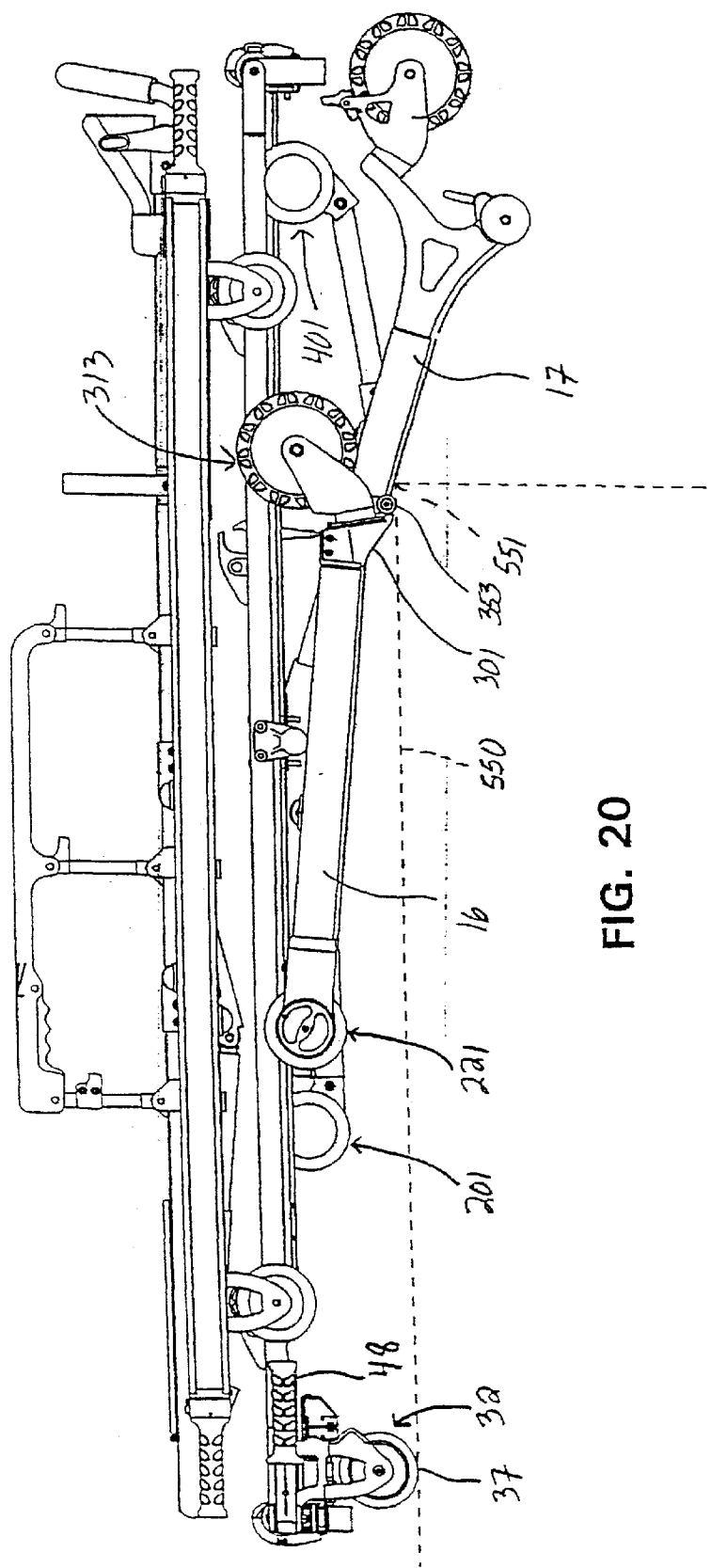
FIG. 20 is an elevational view with the ambulance stretcher in a lower position.

It is sometimes desired to move the stretcher from a raised position (FIG. 1) into a lowered position (FIG. 20). Subassemblies 91 and 93 are actuated to lower the stretcher. Handle 121 is rotated clockwise to remove finger 127 from hole 117. The shaft 221 moves rearwardly so that rear legs 16 pivot about brace 213. This allows the head end to be lowered. Handle 161 is rotated counterclockwise which removes finger 167 from hole 117. The rear shaft 401 slides rearwardly so that legs 17 pivot about shaft 375. Once the select height is reached, handles 121 and 161 are released and the trigger locks 126, 166 fix the shafts 221 and 401.

Referring now to FIG. 20, the ambulance stretcher 10 is shown in a lowered position. In this position, frame 14 is in a horizontal orientation. Litter 12 is therefore in a like orientation. The stretcher 10 is mobile due to the castor wheels 344 of the front legs 16 and the rollers 392 of the rear legs 17 being in contact with a floor.

To raise the stretcher from the lowered position, the handles 121 and 161 are rotated to release the fingers 127 and 167 from holes 117. The base 11 is raised into the raised position with the shafts 221 and 401 moving forwardly to pivot the legs 16 and 17. Once the raised position is reached, the springs 123 and 163 urge fingers 127 and 167 into holes 117 to fix the longitudinal positions of shafts 221 and 401. Hence, legs 16 and 17 are fixed.

Figure 21:
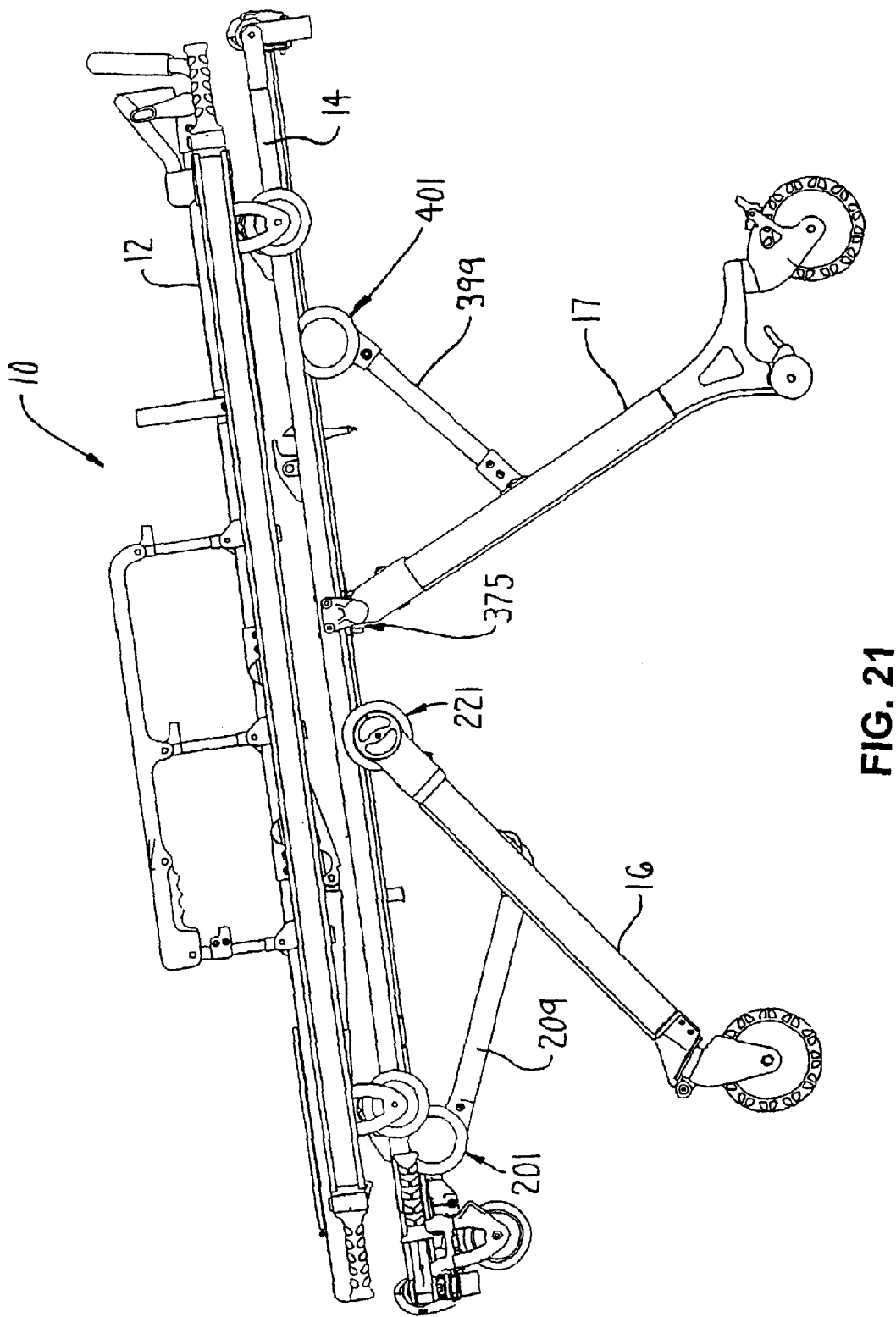
FIG. 21 is an elevational view with the ambulance stretcher with the head end lowered.

It is sometimes desirable to lower the head end into the Trendelenberg position. In this position, the patient's head is lowered below the rest of the body. Accordingly, the head end of the stretcher is lowered below the foot end. To move to this position, a person can lower the head end of the stretcher 10 using subassembly 91. The person grips handle 121 and rotates it clockwise into an upper position. This removes the finger 127 from hole 117. The sleeve 113 of subassembly 91 and shaft 221 now rearwardly move. The front shaft 201 is fixed. Accordingly, brackets 209 and cross brace 213 are fixed. Front legs 16 pivot about the longitudinally fixed cross brace 213. The castored ends of the front legs 16 move forwardly and the stretcher head end is lowered. Once the desired height of the head end is reached, the handle 121 is released and the finger 127 rotates into the aligned hole 117 to fix the longitudinal position of sleeve 113 and shaft 221. The height of the stretcher head end is accordingly fixed lower than the stretcher foot end (FIG. 21). The procedure is reversed to raise the head end.

Control unit 50 can also activate the subassembly 91 to raise and lower the stretcher head end. The person grips arm 67 of lever 59 with the handle 47 in the extended position. Arm 67 is pulled upwardly. The lever 59 pivots about pin 56. Trigger arm 68 pulls cable 78. The cable 78 is connected to the lever .125 on control shaft 124. This causes the shaft 124 to rotate and remove finger 127 from hole 117. The operation of sleeve 113 and shaft 221 are now movable as discussed above. Once the actuator 59 is released, spring 123 urges finger 127 into an aligned hole 117 to fix the longitudinal position of shaft 221. The stretcher head end height is now fixed.

If the handle 47 is in its folded position and arm 67 is pulled upwardly, the control shaft 124 would not rotate. First, the handle 121 is abutting the connector 26 preventing its further rotation. Second, the cable 78 will attempt to rotate control shaft 124 in a direction urging the finger 127 further into hole 117. With the handle 47 folded, the cable 78 will merely slacken when arm 67 is pulled upwardly. Consequently, control unit 50 cannot adjust the height of the head end with the handle 47 in its folded position.

Figure 22:
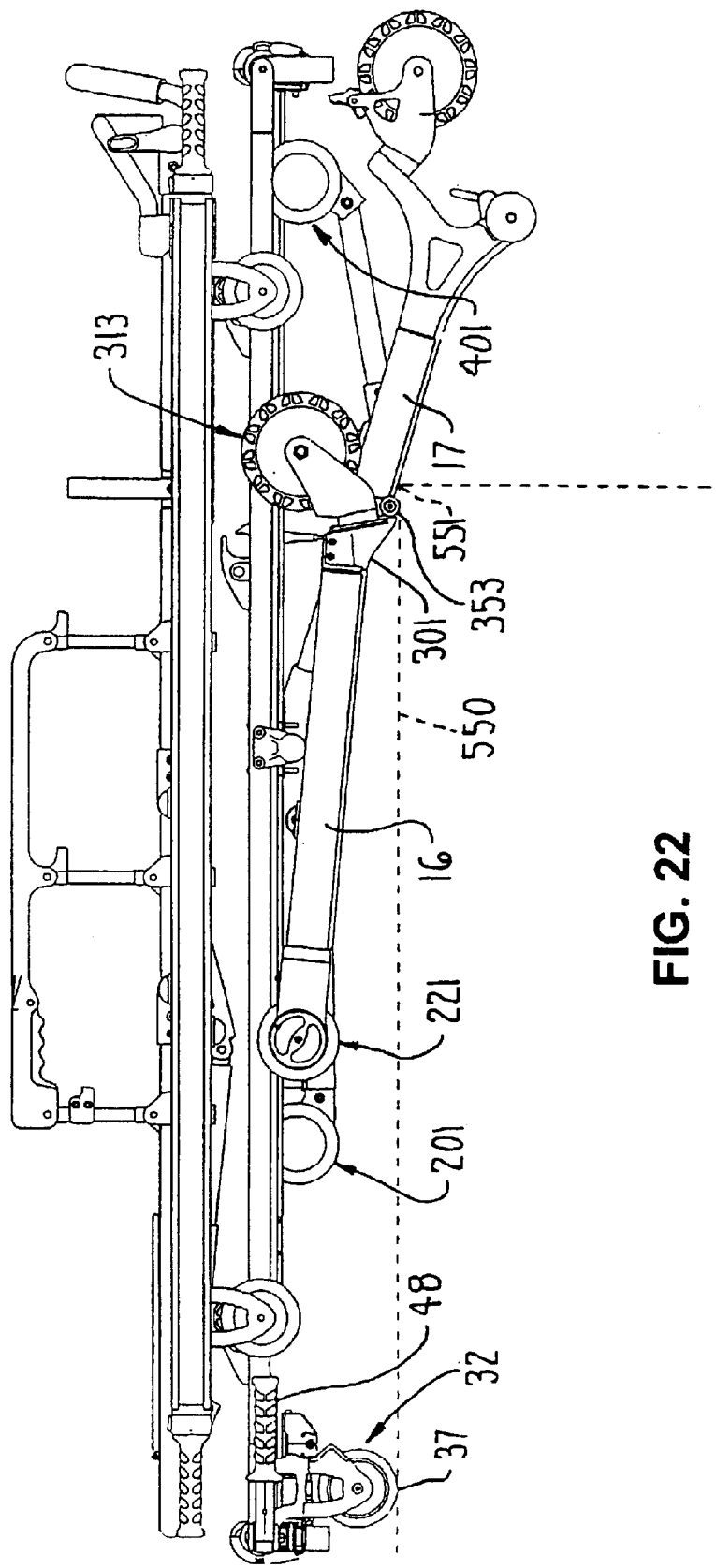
FIG. 22 is an elevational view with the ambulance stretcher partially inserted into an emergency vehicle.

As with most emergency stretchers, it is desired to place the stretcher 10 on a support surface 550 in an emergency vehicle. The support surface is usually the bed of a truck and is schematically shown in FIG. 22. Here the stretcher is shown partially inserted onto or removed from support surface 550. The legs 16, 17 of the stretcher must collapse beneath the frame 14 to allow the stretcher to be easily inserted onto the support surface 550. It is desired to reduce stretcher height due to limited space in vehicle. It is also desirable to not have to lift the stretcher 10 and patient up into the vehicle.

The present stretcher 10 is pushed onto a support surface 550 by one person located at the foot end of the stretcher. The wheel assembly 32 is positioned on surface 550. Handle 131 is rotated to release the sleeve 113 and front shaft 201 for rearward longitudinal movement on beam 20. The stretcher 10 is moved forwardly and the wear bumpers 285 on the front legs 16 contact the rear edge 551 of the surface 550. Continued forward movement of the stretcher 10 forces the front shaft 201 and associated sleeve 113 to move rearwardly. The front legs 16 pivot rearwardly about longitudinally fixed shaft 221. The wear bumpers 285 slide on the support rear edge 551 until the short wear bumpers 306 at skirts 301 slide on edge 551. At this time, front shaft 201 is adjacent shaft 221 with the braces 209 intermediate legs 16. Continued movement of the stretcher forwardly causes the wear rollers 353 to ride on the support 550. The wear rollers 353 only support the front legs 16. Wear bumpers 285 and 306 do not contact support 550 when the wear rollers contact the support. This reduces wear on the wear bumpers 285, 306, and in particular the bottom edge to the short wear bumpers 306 which would ride on the support but for the wear rollers 353.

Wheel assembly 32 of this stretcher 10 is designed to hold the frame 14 above the ground a sufficient distance so that, when legs 16 are collapsed, casters 313 can be in their fixed orientation. Typically, when the stretcher 10 is being pushed onto the ambulance surface 550, front casters 313 are in the fixed orientation. Owing to the above-stated positioning of the frame 14 provided by wheel assembly 32, personnel do not have to spend time releasing the casters from the fixed orientation. This feature of the invention thus assists in holding the number of steps personnel have to take in order to load the stretcher to a minimum. It will be recognized that the stretcher 10 can also be inserted onto the support surface 550 with the castors 313 in a free, swiveling state.

Handle 161 is rotated to release the rear cylinder 153 for rearward longitudinal movement on beam 20. This allows the rear legs 17 to fold upwardly toward the frame 14. The rear shaft 401 moves rearwardly with cylinder 153. Continued forward movement of the stretcher causes the wear bumpers 285 on rear legs 17 to contact the support 550. These wear bumpers 285 ride on the support 550 as the rear shaft 401 moves rearwardly to allow the rear legs pivot about shaft 375. The rear legs 17 are positioned partially intermediate front legs 16 when in the collapsed position. Once the end of the rear legs 17 reach the edge to the support 550, rollers 392 contact support 550. Rollers 392 support the rear legs 17 and foot end of the stretcher. The litter 12 is stored generally parallel to the support 550.

The state of the lock assembly 30 is not changed by the pivoting movement of the front legs 16. Mounting the lock assembly 30 to the shaft 221 and legs 16 prevents any change in relative position of the lock assembly elements. More specifically, the end caps 223 and knobs 245 simultaneously rotate with the legs 16 and shaft 221 when changing the height of the stretcher. The knobs 245 do not rotate relative to caps 223. The legs 16 have a fixed length. Collapse of the legs 16 does not alter the position of the control cables 270. As a result, the state of the lock assembly 30 does not change until the control knobs are rotate relative to end caps 223.

Although a particular preferred embodiment of the invention has been disclosed in detail for illustrative purposes, it will be recognized that variations or modifications of the disclosed apparatus, including the rearrangement of parts, lie within the scope of the present invention. For example, the described embodiment includes two control knobs that are fixed together. Rotation of one knob to lock or unlock the castor lock connected thereto by the cable causes the other knob to rotate to corresponding lock or unlock the other castor lock. It is within the scope of this invention to provide other manually engagable elements, for example levers, buttons, etc. having lock and unlock positions. These manually engageable elements have castor lock and castor unlock positions. These elements are fixed together so that movement of one moves the other. Preferably, these elements are mounted to the leg 16 or shaft 221 so that there is no relative movement between the elements, leg and shaft when pivoting the legs to adjust the stretcher height or to collapse the legs for insertion into a vehicle.

It is also within the scope of the present invention to separately link each control element to both plunger locks 320. Movement of one control element to another position will lock or unlock both pivot locks but does not change the position of the other control element. For example, each control element can have two cables, one cable runs to the plunger lock on the same side as the control element and the other cable runs to the plunger lock on the other side.

Additionally, it will be recognized that the stretcher 10 as well as its individual subassemblies can have other applications. Clearly various subassemblies that form this stretcher can be incorporated into other stretchers to facilitate well being of a patient or ease the work load of the attending medical personnel. Therefore, it is an object of the appended claims to cover all such modifications and variations that come within the true spirit and scope of this invention.

What is claimed is:

1. A stretcher comprising:
    an elongate frame for supporting a patient, the frame having a front end, a rear end opposite the front end and opposed sides;
    a shaft mounted to the frame so as to have a first end located adjacent the first side of the frame and a second end located adjacent the second side of the frame;
    first and second front legs attached to said frame adjacent the front end, said first front leg being attached to the first end of said shaft and said second front leg being attached to the second end of said shaft;
    a first front castor wheel attached to said first front leg and a second front castor wheel attached to said second front leg, said front castor wheels being attached to said front legs so that said front castor wheels are able to swivel relative to said front legs;
    a castor lock assembly being attached to each said front leg, each said castor lock assembly including:
        a locking member, said locking member being moveably attached to said front leg to move from a locked position wherein the locking member engages a portion of said castor wheel attached to said front leg to prevent swivel movement of said castor wheel and a release position wherein said locking member is spaced from the castor wheel so that the castor wheel is able to swivel;
        a cable that extends through said leg, said cable being attached to said locking member for moving said locking member between the locked position and the release position; and
        a control member moveably mounted to the end of said shaft to which said leg is attached, said cable being attached to said control member so that movement of said control member results in actuation of the cable; and
    first and second rear legs attached to the frame adjacent the rear end of said frame.

2. The stretcher of claim 1, wherein:
    said first front leg is mounted to a first end cap that is rotatably attached to the first end of said shaft and said second front leg is mounted to a second end cap that is rotatably attached to the second end of said shaft; and
    each said castor lock assembly is moveably attached to said end cap to which said leg with which said control member is associated is attached.

3. The stretcher of claim 2, wherein said shaft is moveable along the length of said frame.

4. The stretcher of claim 2, wherein said control members are connected to said end caps to rotate with said end caps.

5. The stretcher of claim 2, wherein:
    said shaft is moveable along the length of said frame;
    said control members are rotatably mounted to separate ends of said shaft; and
    a rod is rotatably disposed in said shaft, and said rod has a first end to which a first one of said control members is attached and a second end to which a second one of said control members is attached so that said rod causes said control members to rotate in unison.

6. The stretcher of claim 1, wherein:
    said control members are rotatably mounted to separate ends of said shaft; and
    a rod is rotatably disposed in said shaft, and said rod has a first end to which a first one of said control members is attached and a second end to which a second one of said control members is attached so that said rod causes said control members to rotate in unison.

7. The stretcher of claim 1, further including two control lock assemblies, each said control lock assembly being located between a separate one of said control members and said shaft and having a lock member that moveably engages a portion of said control member with which said control lock assembly is associated for releasably holding said control member in a fixed position relative to said shaft.

8. The stretcher of claim 1, wherein:
    a castor base connects each said front castor wheel to said front leg with which said castor wheel is associated and said base is connected to said front leg to swivel;
    each said castor lock assembly includes a pin that functions as said locking member and said pin is retractably mounted to said front leg with which said castor lock assembly is associated so as to have an extended position wherein said pin engages a portion of said castor base and a retracted position wherein said pin is spaced from said castor base.

9. A stretcher comprising:
    an elongate frame for supporting a patient, the frame having a front end, a rear end opposite the front end and opposed sides;
    first and second front legs attached to the frame adjacent the front end;
    a first front castor wheel attached to said first front leg and a second front castor wheel attached to said second front leg, said front castor wheels being attached to said front legs so that said front castor wheels are able to swivel relative to said front legs;
    a castor lock assembly, said castor lock assembly including:
        two locking members, each said locking member being moveably attached to a separate one of said front legs to move from a locked position wherein said locking member engages a portion of said castor wheel attached to said front leg to prevent swivel movement of said castor wheel and a release position wherein the locking member is spaced from the castor wheel so that the castor wheel is able to swivel;

two cables, each said cable being located in a separate one of said front legs and attached to said locking member attached to said front leg for moving said locking member between the locked position and the release position;

a rod rotatably mounted to said frame, wherein said cables are connected to said rod so as to be simultaneously actuated by the rotation of said rod; and at least one control member moveably connected to the frame and attached to said rod for manually rotating said rod; and first and second rear legs attached to the frame adjacent the rear end; and a first rear castor wheel attached to said first rear leg and a second rear castor wheel attached to said second rear leg.

10. The stretcher of claim 9, wherein:

said rod extends from side-to-side across the frame and has opposed ends, each end being located adjacent a separate one of the sides of said frame;

said at least one control member comprises a first knob attached to a first end of said rod; and a second one of said control members comprises a second knob attached to a second end of said rod.

11. The ambulance stretcher of claim 10, wherein said rod is rotatably mounted in a shaft to which said front legs are rotatably attached and said shaft is mounted to the frame so as to move longitudinally along the frame.

12. The ambulance stretcher of claim 9, wherein said rod is rotatably mounted in a shaft to which said front legs are rotatably attached and said shaft is mounted to the frame so as to move longitudinally along the frame.

13. The ambulance stretcher of claim 12, further including a control lock assembly, said control lock assembly being located between a separate one of said control members and said shaft and said control lock assembly has a lock member that moveably engages a portion of said control member with which said control lock is associated for releasably holding said control member in a fixed position relative to said shaft.

14. The ambulance stretcher of claim 9, wherein:

a castor base connects each said front castor wheel to said front leg with which said castor wheel is associated and said base is connected to said front leg to swivel;

each said castor lock assembly includes a pin that functions as said locking member and said pin is retractably mounted to said front leg with which said castor lock assembly is associated so as to have an extended position wherein said pin engages a portion of said castor base and a retracted position wherein said pin is spaced from said castor base.

15. A stretcher comprising:

an elongate frame for supporting a patient, said frame having a front end and a rear end opposite the front end;

first and second front legs attached to said frame adjacent the front end for holding the frame above ground level, wherein said front legs are moveably attached to the frame so that the height at which the front legs hold the frame above ground level can be selectively adjusted;

a front leg control assembly attached to said frame for releasably holding said front legs in a fixed position, said front leg control assembly having a locked state in which said front leg control assembly holds said front legs in a fixed position or a release state in which said front leg control assembly allows said front legs to move;

first and second rear legs attached to said frame adjacent the rear end for holding said frame above ground level, wherein said rear legs are moveably attached to said frame so that the height at which the rear legs hold the frame above ground level can be selectively adjusted;

a rear leg control assembly attached to said frame for releasably holding said rear legs, said rear leg control assembly having a locked state in which the control assembly holds the rear legs in a fixed position and a release state in which the control assembly allows the rear legs to move;

at least one handle pivotally mounted to one end of said frame so as to have an extended position wherein said handle extends away from the end of the frame to which the handle is mounted and a retracted position wherein the handle does not extend away from the frame;

a release mechanism attached to said frame for selectively displacing at least one of the front leg control assembly or the rear leg control assembly from the locked state to the release state, said release mechanism including:

a release lever connected to said handle to move between the extended and retracted positions with the handle and that is attached to the handle to move relative to the handle; and a linkage member that extends between said release lever and the leg control assembly with which said release mechanism is associated and that is connected to said release lever and the leg control assembly so that: when the handle and the release lever are in the extended position, actuation of said release lever results in displacement of said linkage member that moves the leg control assembly from the locked state to the release state; and, when the handle and the release lever are in the retracted position, actuation of said release lever does not result in displacement of said linkage member that moves the leg control assembly from the locked state.

16. The stretcher of claim 15, wherein said linkage member is attached to said release lever and said leg control assembly with which said release mechanism is associated so that:

when said handle and said release lever are in the extended position, actuation of said release lever results in said linkage member being pulled away from the frame; and when the handle and said release lever are in the retracted position, actuation of said release lever does not result in said linkage member being pulled away from the frame.

17. The stretcher of claim 16, wherein said linkage member is a cable that extends between said release lever and the leg control assembly with which said release mechanism is associated.

18. The stretcher of claim 15, wherein said linkage member is a cable that extends between said release lever and the leg control assembly with which said release mechanism is associated.

19. The stretcher of claim 15, wherein:

the leg control assembly with which said release mechanism is associated has a control rod that is rotated to move the leg control assembly from the locked state to the release state; and said linkage member is connected to said control rod to rotate said control rod.

20. The stretcher of claim 15, wherein said handle is connected to the front end of the frame.

21. The stretcher of claim 15, wherein: said release mechanism is connected to said front leg control assembly.

22. The stretcher of claim 15, wherein said front leg control assembly includes: a shaft to which said front legs are attached and said shaft is moveably attached to the frame to move a selective distance along the length of the frame; and a lock assembly connected to said shaft for controlling movement of said shaft along the frame.

23. The stretcher of claim 15, wherein said release mechanism further includes a second release lever that is moveably connected to said frame and that is connected to the leg control assembly with which said release mechanism is associated to selectively move the leg control assembly from the locked state to the release state.

24. The stretcher of claim 15, wherein said handle is attached to said frame so that said handle and said release lever move 180° between the extended position and the retracted position.

25. The ambulance stretcher of claim 15, wherein said release lever is pivotally attached to said handle.

* * * * *